United States Patent
Kodama et al.

(10) Patent No.: US 9,828,856 B2
(45) Date of Patent: *Nov. 28, 2017

(54) CONVEYANCE MACHINE AND MANAGEMENT SYSTEM

(71) Applicants: Komatsu Ltd., Tokyo (JP); The University of Tokyo, Tokyo (JP)

(72) Inventors: Yuichi Kodama, Hiratsuka (JP); Masaaki Uetake, Kawasaki (JP); Kazunari Kawai, Kawasaki (JP); Shinichi Terada, Kawasaki (JP); Rui Fukui, Tokyo (JP)

(73) Assignees: Komatsu Ltd., Tokyo (JP); The University of Tokyo, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/024,524

(22) PCT Filed: Sep. 30, 2014

(86) PCT No.: PCT/JP2014/076191
§ 371 (c)(1),
(2) Date: Mar. 24, 2016

(87) PCT Pub. No.: WO2015/046600
PCT Pub. Date: Apr. 2, 2015

(65) Prior Publication Data
US 2016/0237820 A1 Aug. 18, 2016

(30) Foreign Application Priority Data
Sep. 30, 2013 (JP) ................................ 2013-205955

(51) Int. Cl.
*B60P 1/00* (2006.01)
*E21F 13/02* (2006.01)
(Continued)

(52) U.S. Cl.
CPC .............. *E21F 13/025* (2013.01); *B60P 1/00* (2013.01); *B60P 1/32* (2013.01); *B60P 3/00* (2013.01);
(Continued)

(58) Field of Classification Search
CPC . E21F 13/025; E21F 13/02; B60P 1/00; B60P 1/32; B60P 3/00; B60P 1/04;
(Continued)

(56) References Cited

U.S. PATENT DOCUMENTS 7,899,599 B2   3/2011   Makela et al.
2004/0040792 A1   3/2004   Uranaka et al.
(Continued)

FOREIGN PATENT DOCUMENTS

JP   1976-71509 U   6/1976
JP   63-284608 A   11/1988
(Continued)

OTHER PUBLICATIONS

International Search Report dated Dec. 22, 2014, issued for PCT/JP2014/076191.
(Continued)

*Primary Examiner* — Michael D Lang
(74) *Attorney, Agent, or Firm* — Locke Lord LLP

(57) ABSTRACT

A conveyance machine that conveys a load, the conveyance machine includes: a traveling unit; a vehicle body arranged above the traveling unit; a vessel provided on the vehicle body; a first detecting unit that detects a loading machine that loads a load on the vessel; and a processing unit that adjusts a position of the vessel according to a detected result of the first detecting unit so as the vessel to be positioned at a loading point where the loading machine performs loading.

19 Claims, 15 Drawing Sheets

(51) Int. Cl.
*B60P 1/32* (2006.01)
*B60P 3/00* (2006.01)
*G05D 1/02* (2006.01)
*B60P 1/28* (2006.01)
*B60P 1/04* (2006.01)
*B65G 67/04* (2006.01)

(52) U.S. Cl.
CPC ............ *E21F 13/02* (2013.01); *G05D 1/021* (2013.01); *G05D 1/0257* (2013.01); *G05D 1/0287* (2013.01); *B60P 1/04* (2013.01); *B60P 1/28* (2013.01); *B65G 67/04* (2013.01); *G05D 2201/021* (2013.01)

(58) Field of Classification Search
CPC ......... B60P 1/28; G05D 1/021; G05D 1/0257; G05D 1/0287; G05D 2201/021; B65G 67/04
See application file for complete search history.

(56) References Cited

U.S. PATENT DOCUMENTS

| | | | |
|---|---|---|---|
| 2006/0069472 A1* | 3/2006 | Makela | ................ B60W 40/00 701/23 |
| 2013/0060425 A1 | 3/2013 | Makela | |
| 2014/0261152 A1 | 9/2014 | Tanaka et al. | |

FOREIGN PATENT DOCUMENTS

| | | |
|---|---|---|
| JP | 04-153709 A | 5/1992 |
| JP | 1993-93974 U | 12/1993 |
| JP | 2009-295107 A | 12/2009 |
| JP | 2010-086031 A | 4/2010 |
| JP | 2010-086035 A | 4/2010 |
| JP | 2010-086038 A | 4/2010 |
| JP | 2013-001362 A | 1/2013 |
| WO | WO-2013/058247 A1 | 4/2013 |

OTHER PUBLICATIONS

Supplementary European Search Report dated May 8, 2017, issued for the European patent application No. 14847817.5.

* cited by examiner

CONVEYANCE MACHINE AND MANAGEMENT SYSTEM

FIELD

The present invention relates to a conveyance machine and a management system.

BACKGROUND

As a method of digging mines, surface mining which is a method of mining from the surface, and tunnel mining which is a method of digging through the ground are known. In recent years, tunnel mining has been used much frequently to reduce environmental load and to mine ore existing much deeper in the ground. Patent Literature 1 discloses an example of a technique related to a conveyance machine that works in a mine tunnel.

CITATION LIST

Patent Literature

Patent Literature 1: U.S. Pat. No. 7,899,599

SUMMARY

Technical Problem

A conveyance machine used in tunnel mining operates under an environment different from surface mining. For example, the conveyance machine has to travel in a mine tunnel. Thus, the conveyance machine used in tunnel mining should be designed to be suitable for the environment in tunnel mining.

An objective of the present invention is to provide a conveyance machine and a management system that enable a smooth operation in a tunnel mining site.

Solution to Problem

According to the present invention, a conveyance machine that conveys a load, the conveyance machine comprises: a traveling unit; a vehicle body arranged above the traveling unit; a vessel provided on the vehicle body; a first detecting unit that detects a loading machine that loads a load on the vessel; and a processing unit that adjusts a position of the vessel according to a detected result of the first detecting unit so as the vessel to be positioned at a loading point where the loading machine performs loading.

In the present invention, the processing unit can control the traveling unit to adjust the position of the vessel.

In the present invention, the conveyance machine can further comprise a supporting device that supports the vessel in a manner movable to the vehicle body, wherein the processing unit can control the supporting device to adjust the position of the vessel.

In the present invention, the conveyance machine can further comprise a load detecting unit that detects a condition of a load on the vessel, wherein the processing unit can adjust the position of the vessel to the loading machine according to a detected result of the load detecting unit.

In the present invention, the conveyance machine can be configured to convey the load in a mine tunnel, the conveyance machine can further comprise a second detecting unit that detects the mine tunnel, wherein the processing unit can control the traveling unit in the mine tunnel leading to a target point according to a detected result of the second detecting unit so as the vessel to be positioned at the target point.

According to the present invention, a conveyance machine that conveys a load in a mine tunnel, the conveyance machine comprises: a traveling unit; a vehicle body arranged above the traveling unit; a vessel provided on the vehicle body; a second detecting unit that detects the mine tunnel; and a processing unit that controls the traveling unit in the mine tunnel leading to a target point according to a detected result of the second detecting unit so as the vessel to be positioned at the target point.

In the present invention, the second detecting unit can detect a relative position to a wall of the mine tunnel, and the processing unit can control the traveling unit according to a detected result of the second detecting unit so as the traveling unit to travel along the wall.

In the present invention, the second detecting unit can detect the wall of the mine tunnel, and the conveyance machine can further comprise a storing unit that stores information on the wall of the mine tunnel, and the processing unit can control the traveling unit in the mine tunnel according to a result of detecting the wall of the mine tunnel by the second detecting unit and the information stored in the storing unit.

In the present invention, the second detecting unit can detect a mark provided in the mine tunnel, and the processing unit can control the traveling unit in the mine tunnel according to a result of detecting the mark by the second detecting unit.

In the present invention, the conveyance machine can further comprise a relative position detecting unit that detects a relative position to a reference point by dead reckoning, wherein the processing unit can correct a detected result of the relative position detecting unit according to information on an absolute position in the mine tunnel obtained from a detected result of the second detecting unit.

In the present invention, the target point can include one or both of a loading point where a load is loaded on the vessel and a load dumping point where a load is dumped from the vessel.

According to the present invention, a management system comprises: a position detecting unit that detects a relative position between a conveyance machine that can travel in a mine tunnel and a loading machine that loads a load on a vessel of the conveyance machine; and a processing unit that adjusts a position of the vessel according to a detected result of the position detecting unit so as the vessel to be positioned at a loading point where the loading machine performs loading.

According to the present invention, a management system comprises: a position detecting unit that detects a position of a conveyance machine that can travel in a mine tunnel; and a processing unit that controls a traveling unit of the conveyance machine in the mine tunnel leading to a target point according to a detected result of the position detecting unit so as a vessel of the conveyance machine to be positioned at the target point.

Advantageous Effects of Invention

According to the present invention, a conveyance machine that can operate smoothly in a tunnel mining site is provided.

DESCRIPTION OF EMBODIMENTS

Figure 1:
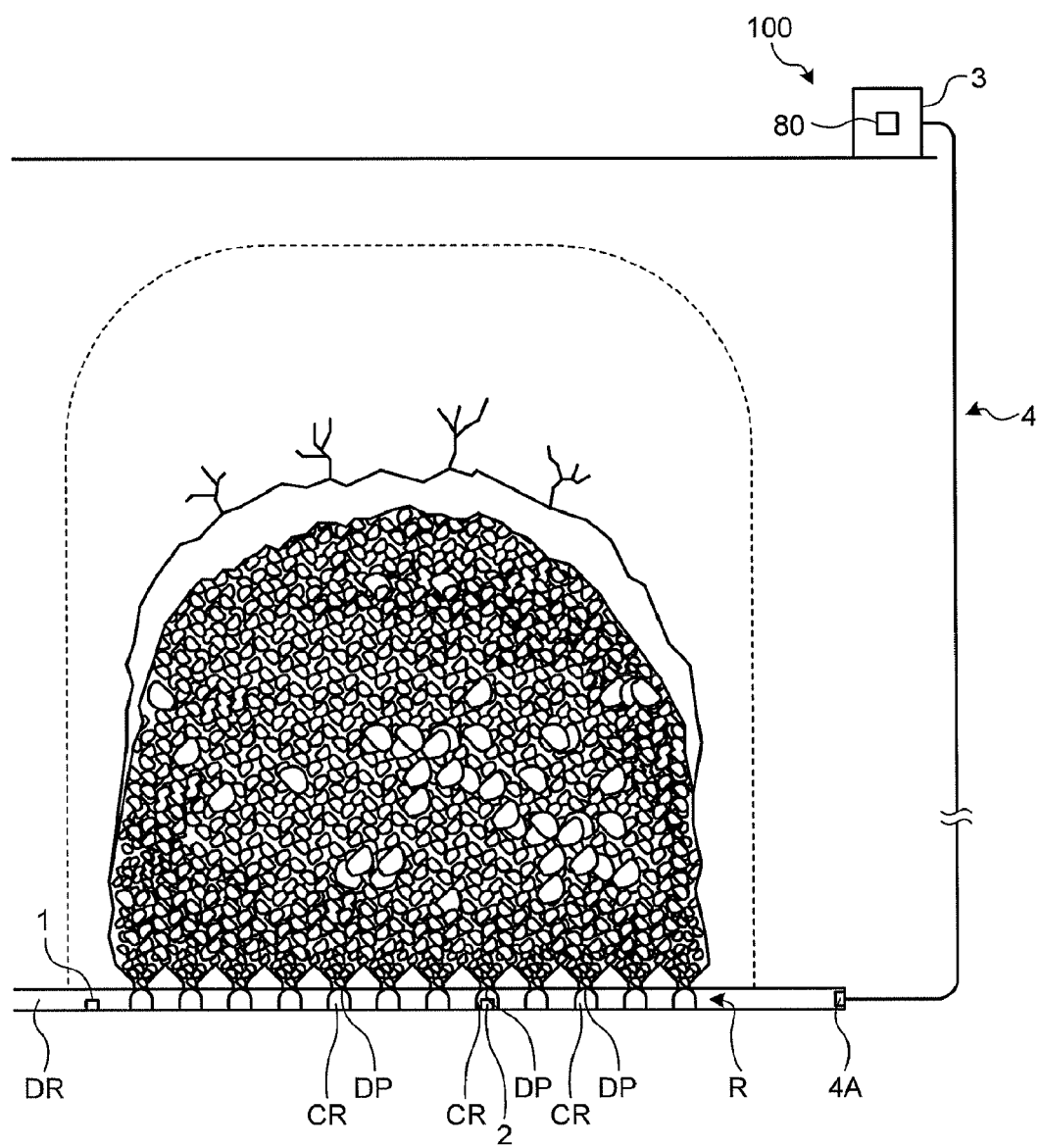
FIG. 1 is a schematic view illustrating an example of a mining site according to an embodiment.

An embodiment according to the present invention will be described below referring to the drawings. The embodiment shall not limit the scope of the invention. Hereinafter in the description, the positional relationship between parts will be explained under the definition that a predetermined horizontal direction is $X_0$ direction, a horizontal direction orthogonal to X direction is $Y_0$ direction, and the direction orthogonal to both $X_0$ direction and $Y_0$ direction is $Z_0$ direction.

<Outline of Mining Site>

FIG. 1 is a schematic view illustrating an example of a site where a conveyance machine 1 and a loading machine 2 according to an embodiment operate. The conveyance machine 1 and the loading machine 2 are used in tunnel mining to mine ore from the ground. The conveyance machine 1 is a mining machine that conveys a load in a mine tunnel R. The loading machine 2 is a mining machine that loads a load on the conveyance machine 1. In the embodiment, the block caving mining is used. The block caving mining is a mining method in which an ore extraction point DP and a mine tunnel R for conveying drawn ore are provided below an ore body (ore vein), an undercut is formed above the extraction point DP to create blasting, thereby allowing the ore to collapse by itself, and the ore is extracted from the extraction point DP. By extracting the ore from the bottom of the ore vein, the collapse propagates to the upper portion of the ore vein, so the ore can be extracted efficiently from the ore vein.

In the embodiment, a control station 3 including a management unit 80 is stationed on the ground or in the tunnel. A management system 100 including the control station 3 manages the mining site. The control station 3 is able to communicate with mining machines in the mine tunnel including the conveyance machine 1 and the loading machine 2 via a communication system 4. In the embodiment, the communication system 4 includes wireless communication, such as Wi-Fi. The communication system 4 is connected to the control station 3 by wire and includes a relay unit 4A provided in the mine tunnel. One or both of the conveyance machine 1 and the loading machine 2 communicates with the control station 3 via the relay unit 4A.

Figure 2:
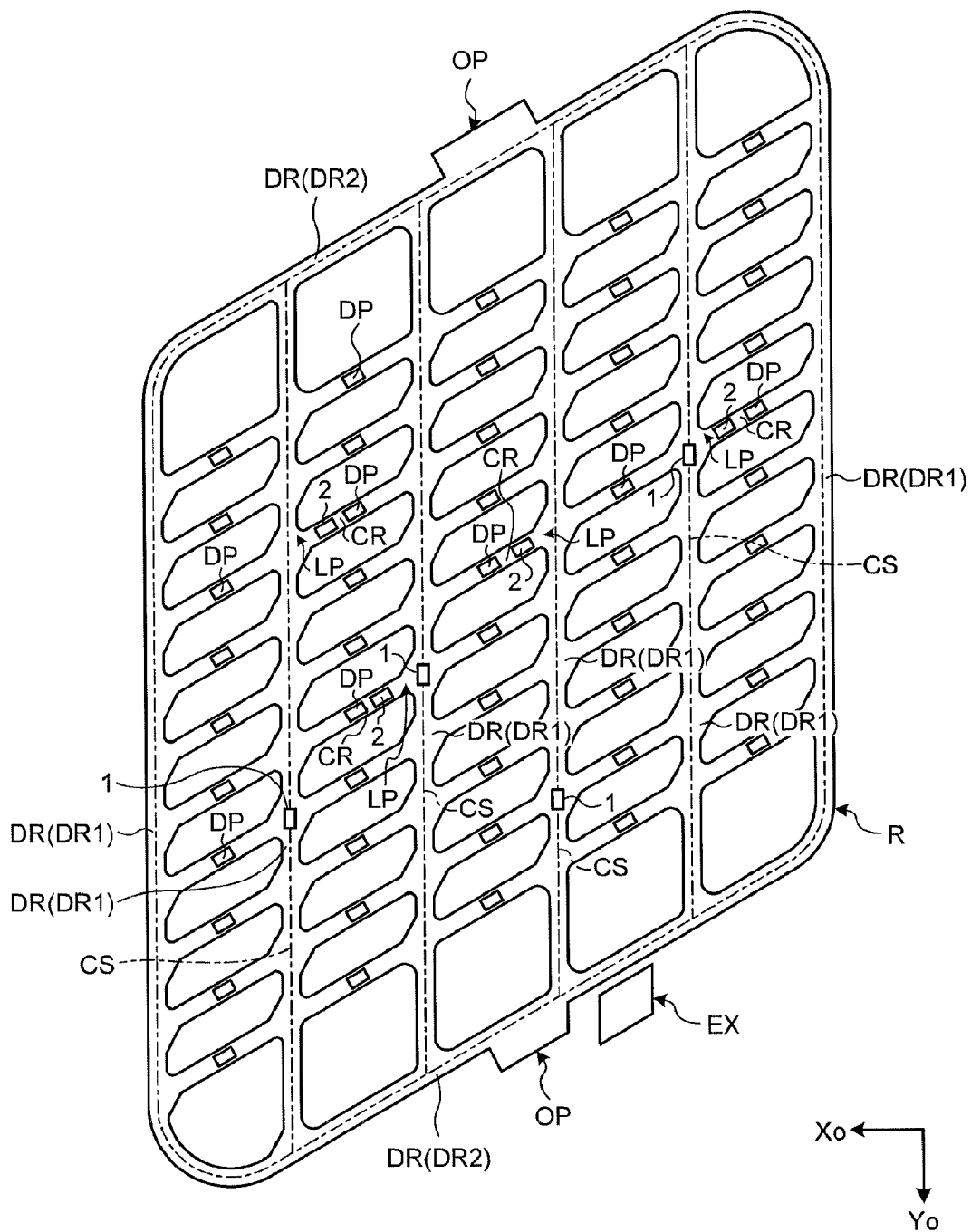
FIG. 2 is a schematic view illustrating an example of a mine tunnel according to the embodiment.
Figure 3:
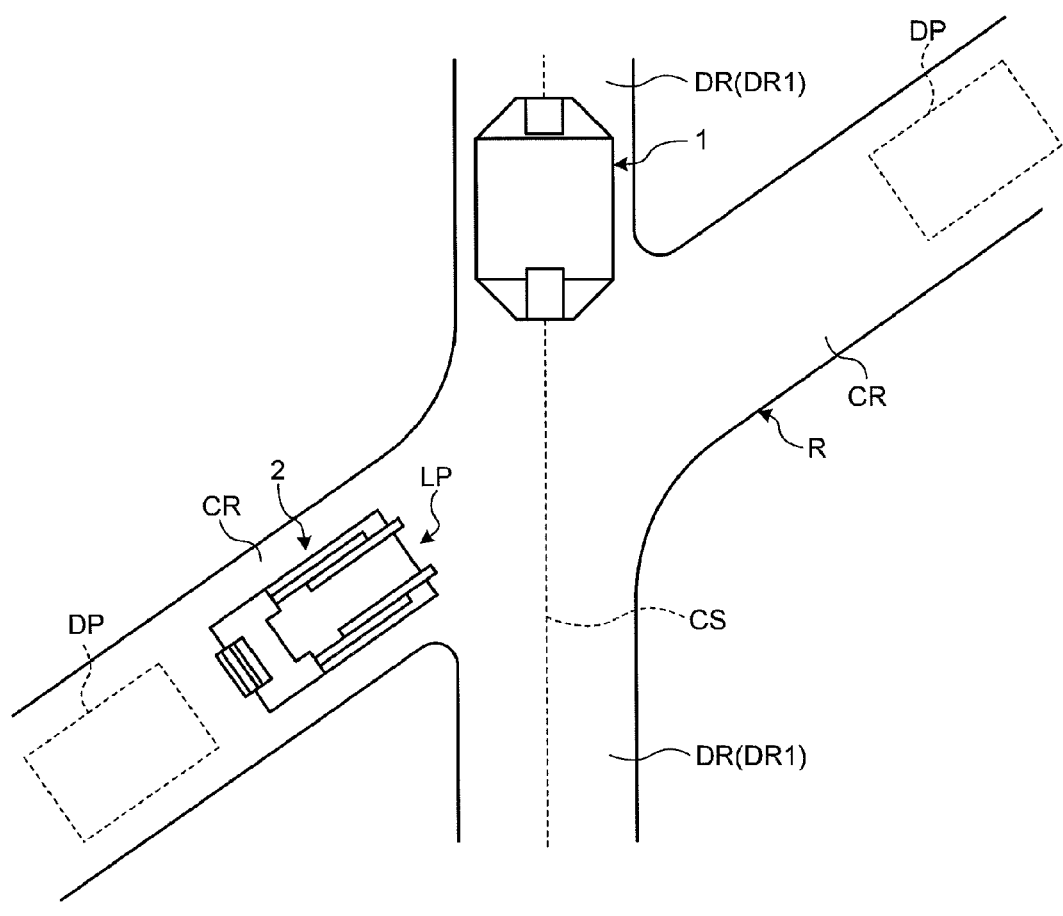
FIG. 3 is an enlarged view of a portion illustrated in FIG. 2.

FIG. 2 is a schematic view illustrating an example of the inside of the mine tunnel. FIG. 3 is an enlarged view illustrating a portion of FIG. 2. In the embodiment, the mine tunnel R includes a first mine tunnel DR in which the conveyance machine 1 travels and a second mine tunnel CR connected to the extraction point DP. The loading machine 2, which performs loading, is positioned in the second mine tunnel CR. In the embodiment, the conveyance machine 1 is an unmanned vehicle that travels autonomously in the mine tunnel R along a predetermined path CS. A loading point LP where a load is loaded on the conveyance machine 1 by the loading machine 2 is located in the second mine tunnel CR or near the second mine tunnel CR. A load dumping point OP through which the load conveyed by the conveyance machine 1 is dumped is provided in the mine tunnel.

The extraction point DP is also called a draw point or a draw bell. Hereinafter in the description, the extraction point DP is referred as a draw point DP. Hereinafter in the description, the first mine tunnel DR is referred as a drift DR, the second mine tunnel CR as a cross-cut CR, and the load dumping point OP as an ore pass OP. A region including the draw point DP and the loading point LP may also be referred as a loading area. A region including the ore pass OP may be referred as a dumping area. After the loading machine 2 has loaded a load on the conveyance machine 1 at the loading point LP near the draw point DP, the conveyance machine 1 travels in the drift DR to the ore pass OP to dump the load at the ore pass OP.

Hereinafter, the path floor of the mine tunnel R on which the conveyance machine 1 travels is assumed to be substantially parallel with $X_0Y_0$ plane (a horizontal plane) for convenience of description. Actually, in many cases, the path floor of the mine tunnel R has irregularities, an uphill slope, and a downhill slope.

In FIG. 2, a plurality of drifts DR is provided in the $X_0Y_0$ plane. A plurality of drifts DR is provided in $XX_0$ direction and includes a first drift DR1 extending along $Y_0$ direction and a second drift DR2 connecting the ends of the first drifts DR1. The ore pass OP is provided in the second drift DR2.

As illustrated in FIG. 3, cross-cuts CR are provided on both sides of each first drift DR1. The conveyance machine 1 is loaded with a load by the loading machine 2 positioned at least in the cross-cuts CR provided in either of the sides of the first drift DR1.

<Conveyance Machine>

Figure 4:
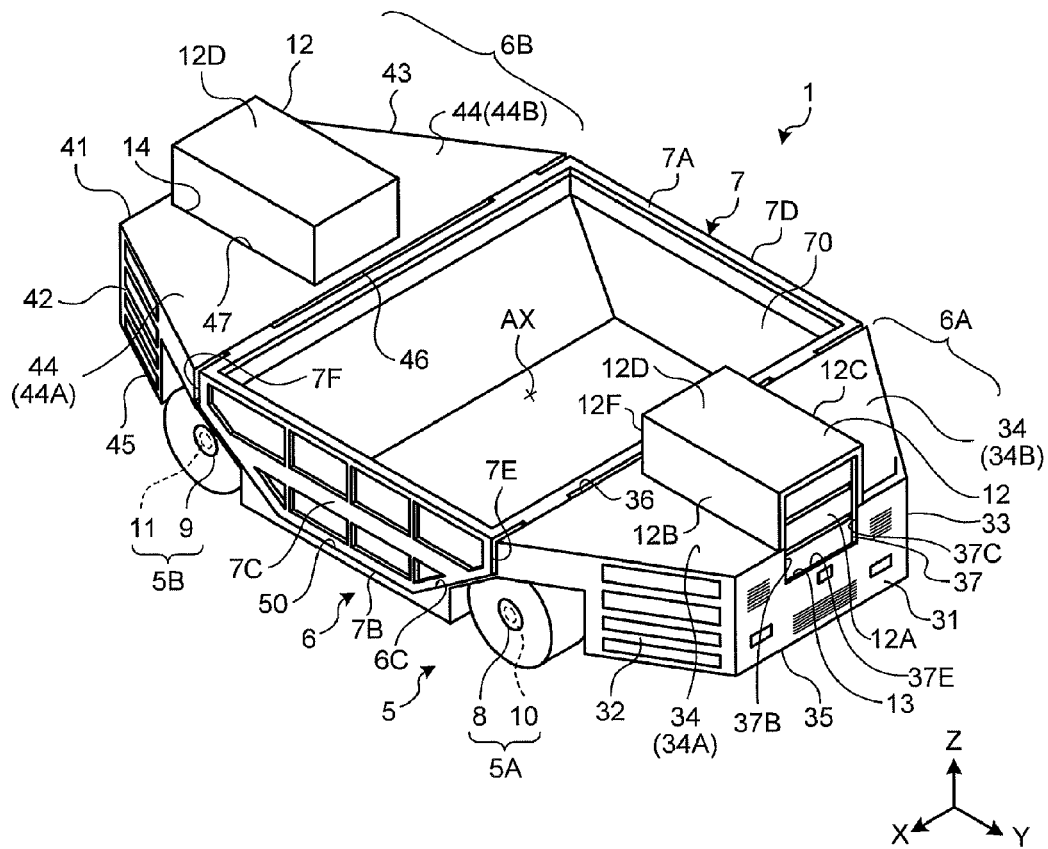
FIG. 4 is a perspective view of an example of a conveyance machine according to the embodiment.
Figure 5:
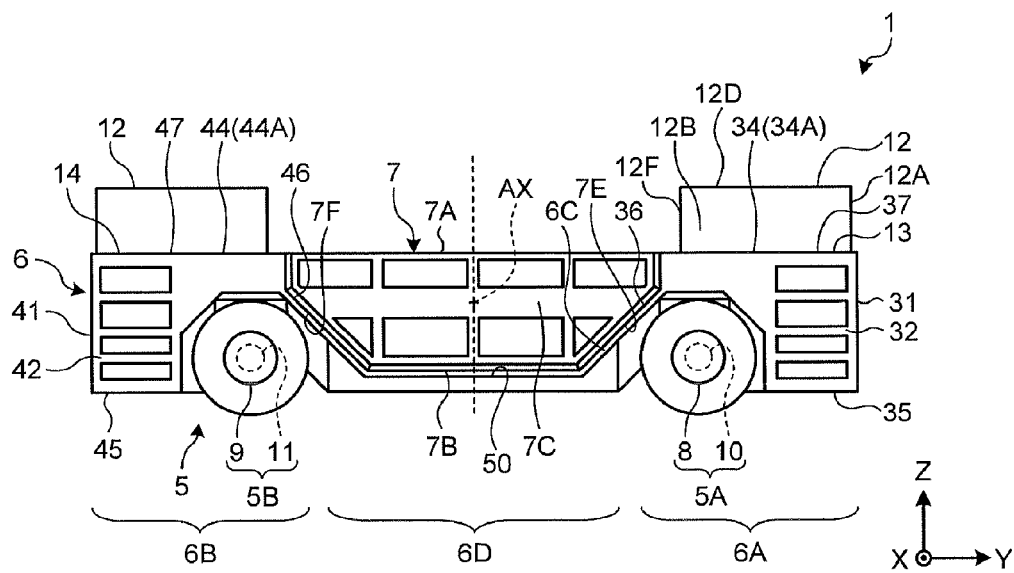
FIG. 5 is a side view of an example of the conveyance machine according to the embodiment.
Figure 6:
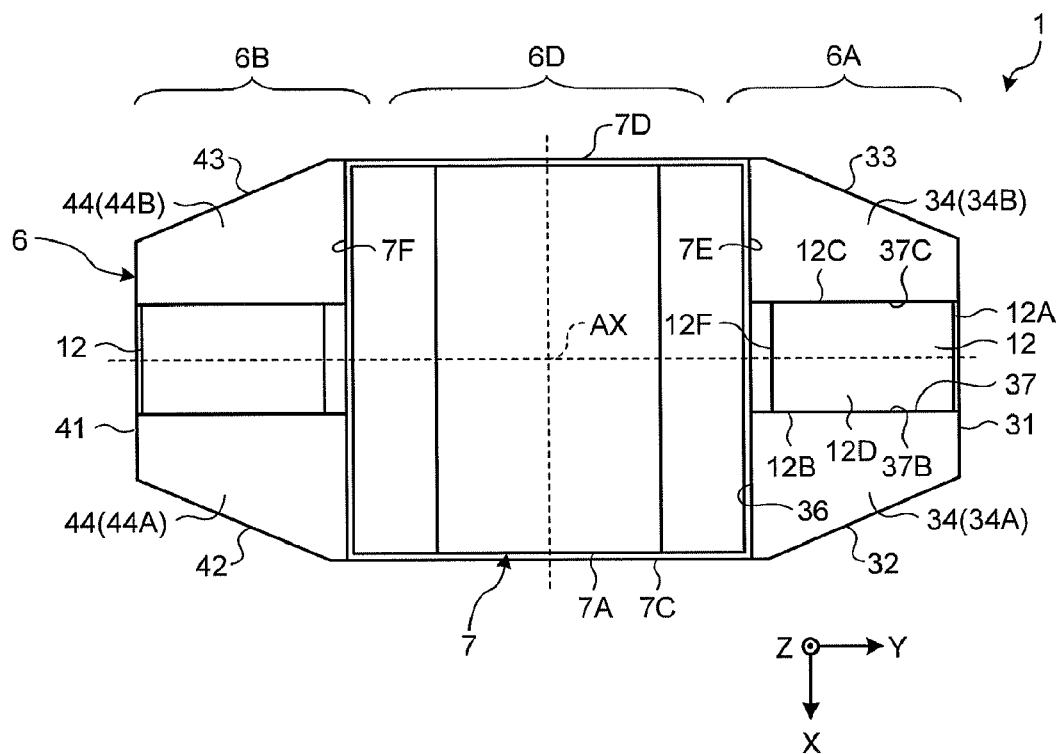
FIG. 6 is a top view of an example of the conveyance machine according to the embodiment.
Figure 7:
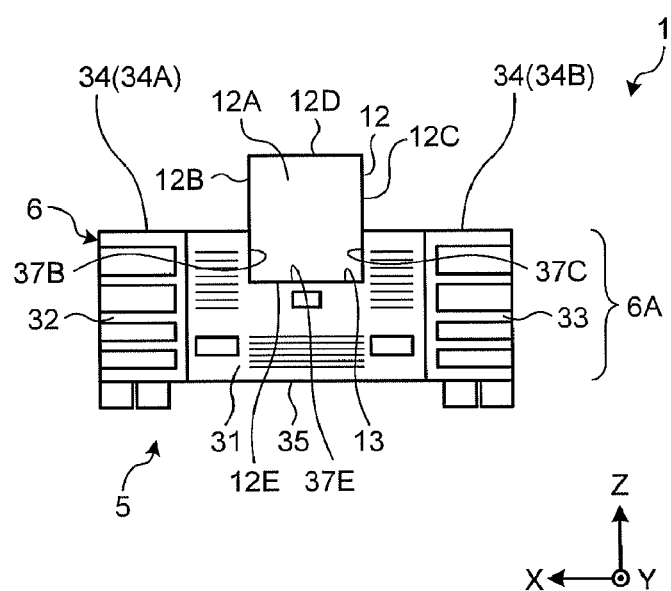
FIG. 7 is a front view of an example of the conveyance machine according to the embodiment.

The conveyance machine 1 will now be described. FIG. 4 is a perspective view illustrating an example of the conveyance machine 1. FIG. 5 is a side view illustrating an example of the conveyance machine 1. FIG. 6 is a top view illustrating an example of the conveyance machine 1. FIG. 7 is a front view illustrating an example of the conveyance machine 1.

Hereinafter, for convenience of description, the direction in the width of the conveyance machine 1 is defined as X direction. Hereinafter, for convenience of description, when the conveyance machine 1 is moving straight, the travel direction (moving direction) of the conveyance machine 1 is parallel with Y direction and the conveyance machine 1 moves in the +Y direction. When the conveyance machine 1 is moving straight, the rotation axis of the wheel (a front wheel 8 and a rear wheel 9) is parallel with X direction and orthogonal to Y direction. Directions indicated by arrows in the figure are +X direction, +Y direction, and +Z direction. Directions opposite to the arrows are −X direction, −Y direction, and −Z direction.

The conveyance machine 1 includes a traveling unit 5, a vehicle body 6 at least a portion of which is arranged above the traveling unit 5, and a vessel 7 supported by the vehicle body 6.

The traveling unit 5 includes the front wheel 8, the rear wheel 9, a front wheel driving unit 10 that drives the front wheel 8, and a rear wheel driving unit 11 that drives the rear wheel 9. Hereinafter in the description, a portion of the traveling unit 5 including the front wheel 8 and the front wheel driving unit 10 is referred as a front traveling unit 5A, and a portion of the traveling unit 5 including the rear wheel 9 and the rear wheel driving unit 11 is referred as a rear traveling unit 5B, as required, for convenience of description.

The vehicle body 6 includes a front section 6A at least a portion of which is arranged above the front wheel 8, a rear section 6B at least a portion of which is arranged above the rear wheel 9, a middle section 6D provided between the front section 6A and the rear section 6B, and a recessed section 6C arranged between the front section 6A and the rear section 6B. The middle section 6D is arranged so as to connect the lower portion of the front section 6A and the lower portion of the rear section 6B. The front section 6A, the rear section 6B, and the middle section 6D form the recessed section 6C. Regarding Y direction, the recessed section 6C is arranged between the front wheel 8 and the rear wheel 9.

The vessel 7 is a member on which a load is loaded by the loading machine 2. At least a portion of the vessel 7 is positioned on the recessed section 6C. Regarding Y direction, at least a portion of the vessel 7 is positioned between the front traveling unit 5A and the rear traveling unit 5B.

The front section 6A includes a holding portion 13 that detachably holds a device 12. The rear section 6B includes a holding portion 14 that detachably holds the device 12. In the embodiment, the device 12 includes a battery. Each of the holding portion 13 and the holding portion 14 includes a connector to which electric power is supplied from the battery 12. An electronic device and an electric machine included in the conveyance machine 1 operate by the electric power supplied from the battery 12.

The embodiment is such that, regarding Y direction in which the traveling unit 5 travels, the portion of the vehicle body 6 arranged in the front side of a center AX of the vehicle body 6 (the front half portion) and the portion of the vehicle body 6 arranged in the rear side (the rear half portion) are symmetric (the fore-aft symmetric). Regarding Y direction, the portion of the traveling unit 5 arranged in the front side of the center AX of the vehicle body 6 and the portion of the traveling unit 5 arranged in the rear side are symmetric. Regarding Y direction, the portion of the vessel 7 arranged in the front side of the center AX of the vehicle body 6 and the portion of the vessel 7 arranged in the rear side are symmetric.

The symmetry (fore-aft symmetry) of the embodiment includes that the portion arranged in one side (the +Y side, or the front side) of a virtual plane (a symmetry plane) that includes the center AX and is parallel with XZ plane and the portion arranged in the other side (the −Y side, or the rear side) are mirror symmetric.

The embodiment is such that, regarding X direction intersecting the traveling direction of the traveling unit 5, the portion of the vehicle body 6 arranged in the right side of the center AX of the vehicle body 6 (the right half portion) and the portion of the vehicle body 6 arranged in the left side (the left half portion) are symmetric (right-left symmetric). Regarding X direction, the portion of the traveling unit 5 arranged in the right side of the center AX of the vehicle body 6 and the portion of the traveling unit 5 arranged in the left side are symmetric. Regarding X direction, the portion of the vessel 7 arranged in the right side of the center AX of the vehicle body 6 and the portion of the vessel 7 arranged in the left side are symmetric.

The symmetry (right-left symmetry) of the embodiment includes that the portion arranged in one side (the +X side, or the right side) of a virtual plane (a symmetry plane) that includes the center AX and is parallel with YZ plane and the portion arranged in the other side (the −X side, or the left side) are mirror symmetric.

The symmetry of the embodiment includes at least one of shape symmetry and structural symmetry. The symmetry includes at least one or both of shape symmetry and structural symmetry. The symmetry includes at least one of complete symmetry and substantial symmetry.

Regarding Y direction, the portion in the front side of the center AX of the vehicle body 6 includes the front section 6A and the front half portion of the middle section 6D which is connected to the front section 6A and arranged in the front side of the center AX. Regarding Y direction, the portion in the rear side of the center AX of the vehicle body 6 includes the rear section 6B and the rear half portion of the middle section 6D which is arranged in the rear side of the center AX. The shape and the structure of the front section 6A are substantially the same as the shape and the structure, respectively, of the rear section 6B. The shape and the structure of the front half portion of the middle section 6D is substantially the same as the shape and the structure, respectively, of the rear half portion of the middle section 6D.

The front section 6A includes a front face 31, a side face 32 arranged in the +X side of the front face 31, a side face 33 arranged in the −X side of the front face 31, a top face 34, an under face 35, and a back face 36 that faces the side opposite to the front face 31 to face the vessel 7. The front face 31 is substantially parallel with XZ plane. Each of the side face 32 and the side face 33 is substantially orthogonal to XY plane and tilts against YZ plane. The side face 32 and the side face 33 tilt in a manner that the distance between the side face 32 and the side face 33 gradually decreases along the direction from the center AX toward the +Y direction, which is the moving direction of the conveyance machine 1. The under face 35 may be substantially parallel with XY plane, or at least a portion of the under face 35 may be angled so as to be higher along the direction from the center AX toward the +Y direction. The shape and the area of the front face 31 are respectively smaller than the shape and the area of the back face 36. The shape and the area of the side face 32 are respectively the same as the shape and the area of the side face 33.

The front section 6A includes a recessed portion 37 in which the battery 12 is placed. The recessed portion 37 is provided in the upper portion of the front section 6A. The holding portion 13 is arranged in the recessed portion 37. The top face 34 is arranged at least on a portion around the top opening of the recessed portion 37. In the embodiment, the recessed portion 37 adjoins the front face 31 and the back face 36 and is provided therebetween. The top face 34 is arranged in both sides of the recessed portion 37 in X direction which intersects the travel direction of the traveling unit 5. Hereinafter in the description, the top face 34 that is arranged in the +X side of the recessed portion 37 and includes the edge of the front section 6A in the +X side is referred as a top face 34A, and the top face 34 that is arranged in the −X side of the recessed portion 37 and includes the edge of the front section 6A in the −X side is referred as a top face 34B as required. The edge of the front section 6A in the +X side includes the top edge of the side face 32, and the edge of the front section 6A in the −X side includes the top edge of the side face 33.

Each of the top face 34A and the top face 34B is substantially parallel with XY plane. Regarding Z direction, the position of the top face 34A is identical to the position of the top face 34B. The position regarding Z direction is the height. The top face 34A and the top face 34B are arranged to be on a plane (in the same plane).

The top face 34A and the top face 34B may differ in height. A device may be mounted on at least one of the top face 34A and the top face 34B.

The shape of the top face 34A and the shape of the top face 34B are identical. In the embodiment, regarding X direction, the recessed portion 37 and the holding portion 13 are arranged in the middle portion of the front section 6A. As described above, the vehicle body 6 is right-left symmetric.

In the embodiment, the shape of the battery 12 is a rectangular solid. The battery 12 has a front face 12A, a side face 12B, a side face 12C, a top face 12D, an under face 12E, and a back face 12F. The recessed portion 37 has a shape that corresponds to the shape of the battery 12. The inner surface of the recessed portion 37 includes a bottom face 37E that opposes the under face 12E of the battery 12, a first inner side face 37B that opposes the side face 12B of the battery 12, and a second inner side face 37C that opposes the side face 12C of the battery 12. The bottom face 37E of the recessed portion 37 is substantially orthogonal to the first inner side face 37B. The bottom face 37E of the recessed portion 37 is substantially orthogonal to the second inner side face 37C.

With the battery 12 held in the holding portion 13 of the recessed portion 37, the top face 12D of the battery 12 is positioned between the first top face 34A and the second top face 34B regarding X direction. In the embodiment, the depth of the recessed portion 37 is smaller than the height of the battery 12. The depth of the recessed portion 37 is the Z directional dimension of the first inner side face 37B and the second inner side face 37C. The height of the battery 12 is the Z directional dimension of the battery 12. With the battery 12 held in the holding portion 13 of the recessed portion 37, the top face 12D of the battery 12 is positioned higher than (in the +Z side of) the top face 34A and the top face 34B. That is, the top face 34 (the top face 34A and the top face 34B) of the front section 6A is arranged to be lower than (in the −Z side of) the top face 12D of the battery 12 held in the holding portion 13.

Regarding Y direction, the dimension of the battery 12 may be approximately equal to or smaller than the dimension of the top face 34. When the battery 12 is held in the holding portion 13, the edge of the top face 34 in the +Y side and the end of the battery 12 facing the +Y direction may or may not be positioned at a same Y position, and the edge of the top face 34 in the −Y side and the end of the battery 12 facing the −Y direction may or may not be positioned at a same Y position. Regarding Y direction, the battery 12 is positioned in the outside of (not protruding from) the top face 34. The front face 12A of the battery 12 and the front face 31 of the front section 6A may be positioned to be on the same plane.

The rear section 6B has a rear face 41, a side face 42, a side face 43, a top face 44, an under face 45, and a back face 46. A recessed portion 47 provided with a holding portion 14 is provided in the upper portion of the rear section 6B. A top face 44A and a top face 44B are provided on both sides of the recessed portion 47. As described above, the rear section 6B is a mirror image of the front section 6A. That is, the recessed portion 47 and the holding portion 14 are arranged in the middle in X direction of the rear section 6B. The recessed portion 47 and the holding portion 14 are arranged between the top face 44A and the top face 44B. The top face 44 (the top face 44A and the top face 44B) of the rear section 6B is arranged to be lower than the top face 12D of the battery 12 held in the holding portion 14. The top face 44A and the top face 44B are arranged to be on the same plane. In the embodiment, the top face 34A, the top face 34B, the top face 44A, and the top face 44B are arranged on the same plane.

The top face 44A and the top face 44B may differ in height. A device may be mounted on at least one of the top face 44A and the top face 44B.

In the embodiment, the shape and the structure of the battery 12 held in the holding portion 13 are substantially the same as the shape and the structure, respectively, of the battery 12 held in the holding portion 14. Therefore, the conveyance machine 1, when holding the battery 12 in the holding portion 13 and the battery 12 in the holding portion 14, is also fore-aft symmetric and right-left symmetric.

In the embodiment, the electric power supplied from the battery 12 held in the holding portion 13 and the electric power supplied from the battery 12 held in the holding portion 14 are added together, and the added electric power is distributed to the electronic device and the electric machine arranged in the front half portion of the conveyance machine 1 and the electronic device and the electric machine arranged in the rear half portion of the conveyance machine 1. It may be configured that the electronic device and the electric machine arranged in the front half portion of the conveyance machine 1 operate by the electric power supplied from the battery 12 held in the holding portion 13 while the electronic device and the electric machine arranged in the rear half portion of the conveyance machine 1 operate by the electric power supplied from the battery 12 held in the holding portion 14.

The vessel 7 includes a recessed portion 70 to contain a load, a top face 7A arranged around the top opening of the recessed portion 70, an under face 7B, a side face 7C facing the +X side, a side face 7D facing the −X side, an opposing face 7E opposing the back face 36 of the front section 6A, and an opposing face 7F opposing the back face 46 of the rear section 6B. The opposing face 7E is angled so as to be higher along the direction from the center AX toward the +Y direction. The opposing face 7F is angled so as to be higher along the direction from the center AX toward the −Y direction. The shape and the structure of the front half portion of the vessel 7 that includes the opposing face 7E and is arranged in the front side of the center AX and the shape and the structure of the rear half portion of the vessel 7 that includes the opposing face 7F and is arranged in the rear side of the center AX are substantially the same, respectively.

The recessed section 6C has a shape that corresponds to the shape of the vessel 7. The inner surface of the recessed section 6C includes a bottom face 50 that faces at least a portion of the under face 7B, a back face 36, and a back face 46. The bottom face 50 of the vehicle body 6 is substantially parallel with XY plane. The back face 36 of the vehicle body 6 is angled so as to be higher along the direction from the center AX toward the +Y direction. The back face 46 of the vehicle body 6 is angled so as to be higher along the direction from the center AX toward the −Y direction.

Regarding X direction, the vehicle body 6 and the vessel 7 have approximately the same dimension. When the vessel 7 and the vehicle body 6 are positioned so as the center of the vehicle body 6 to be on the center of the vessel 7, regarding X direction, the side face 7C, the edge of the back face 36 in the +X side, and the edge of the back face 46 in the +X side are in the same position regarding X direction as well as the side face 7D, the edge of the back face 36 in the −X side, and the edge of the back face 46 in the −X side are in the same position regarding X direction. In other words, regarding X direction, the side face 7C is not positioned in the outside of the side face 32 nor the side face 42, and the side face 7D is not positioned in the outside of the side face 33 nor the side face 43. Note that, regarding X direction, when the vessel 7 and the vehicle body 6 are positioned so as the center of the vehicle body 6 is on the center of the vessel 7, the side face 7C may protrude in the outside of the side face 32 and the side face 42, and the side face 7D may protrude in the outside of the side face 33 and the side face 43.

The top face 7A of the vessel 7 is arranged to be lower than the top face 12D of the battery 12 held on at least one of the holding portion 13 and the holding portion 14. The top face 7A of the vessel 7 is arranged to be lower than the top face 34 of the front section 6A and the top face 44 of the rear section 6B. The top face 7A may be arranged to be lower than the top face 12D but higher than or at the same height as (on the same plane as) the top face 34 and the top face 44.

The front traveling unit 5A is arranged in the +Y side, namely the front side, of the center AX. The rear traveling unit 5B is arranged in the −Y side, namely the rear side, of the center AX. The shape and the structure of the front traveling unit 5A are substantially the same as the shape and the structure, respectively, of the rear traveling unit 5B.

Figure 8:
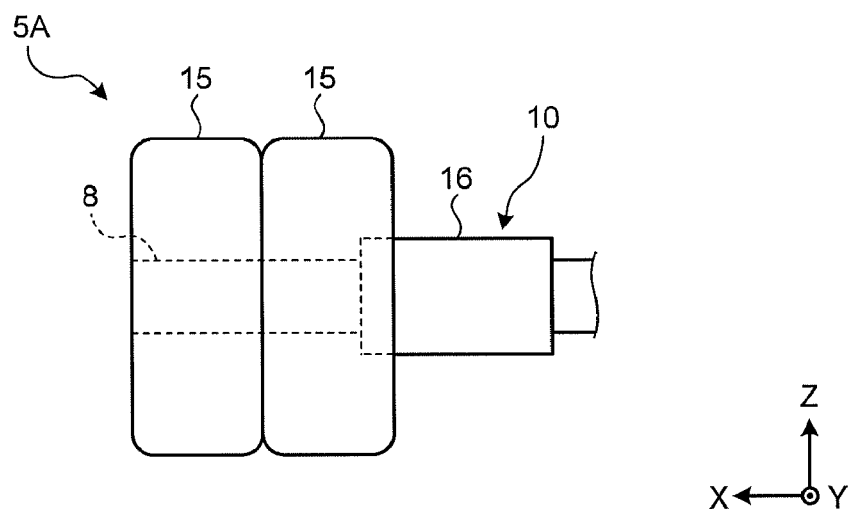
FIG. 8 is a schematic view illustrating an example of a traveling unit according to the embodiment.

FIG. 8 is a figure illustrating a portion of the front traveling unit 5A. The front traveling unit 5A includes a front wheel 8 and a front wheel driving unit 10 that drives the front wheel 8. The front wheel 8 supports a tire 15. In the embodiment, regarding X direction, the front wheel 8 is arranged in both sides of the center AX of the vehicle body 6. The front wheel 8 may be provided with a single tire 15 or two tires. As illustrated in FIG. 8 in the embodiment, two tires 15 are provided to one front wheel 8. That is, the front traveling unit 5A of the embodiment employs a so-called double-tire.

The tire 15 is a solid tire. The tire 15 is not filled with air inside. The tire 15 is thus small in size, which suppresses the height of the conveyance machine 1 becoming high. The tire 15 may be a pneumatic tire (a tire filled with air).

The front wheel driving unit 10 includes an electric motor (an in-wheel motor) 16 at least a portion of which is arranged inside a hub of the front wheel 8. The electric motor 16 operates by electric power supplied from the battery 12. The battery 12 held in the holding portion 13 of the front section 6A supplies electric power to the electric motor 16 of the front wheel driving unit 10. The electric motor 16 for driving the front wheel 8 operates by electric power supplied from the battery 12 held in the holding portion 13 of the front section 6A. The electric motor 16 is arranged in each of the two front wheels 8.

The rear traveling unit 5B has the same configuration as the front traveling unit 5A, so the illustration thereof is omitted. That is, regarding X direction, the rear wheel 9 of the rear traveling unit 5B is arranged in both sides of the center AX of the vehicle body 6. The rear traveling unit 5B employs the double-tire. The shape and the structure of the tire 15 supported by the front wheel 8 are substantially the same as the shape and the structure, respectively, of the tire 15 supported by the rear wheel 9. The rear wheel driving unit 11 includes electric motors 16 each connected to each of the two rear wheels 9. The battery 12 held in the holding portion 14 of the rear section 6B supplies electric power to the electric motor 16 of the rear wheel driving unit 11. The electric motor 16 for driving the rear wheel 9 operates by electric power supplied from the battery 12 held in the holding portion 14 of the rear section 6B.

In the embodiment, the front wheel 8 is driven by the front wheel driving unit 10, and the rear wheel 9 is driven by the rear wheel driving unit 11. That is, the traveling unit 5 employs a so-called all-wheel drive, in which all four wheels are driven by driving units. The front wheel driving unit 10 drives the front wheel 8 but does not drive the rear wheel 9. The rear wheel driving unit 11 drives the rear wheel 9 but does not drive the front wheel 8.

Figure 9:
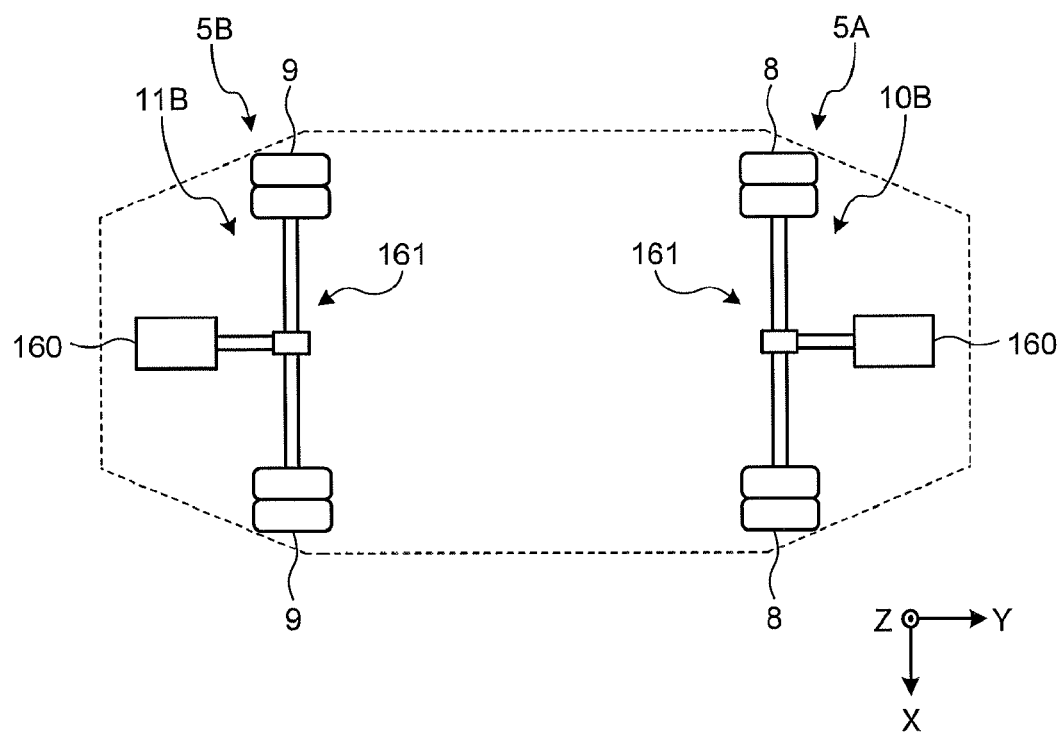
FIG. 9 is a schematic view illustrating an example of the traveling unit according to the embodiment.

FIG. 9 is a schematic view illustrating an example of the traveling unit 5. The front traveling unit 5A of the traveling unit 5 includes a front wheel 8 and a front wheel driving unit 10B that drives the front wheel 8. The front wheel driving unit 10B includes an electric motor 160 and a power transmission unit 161 that transmits the power generated by the electric motor 160 to each of the right and left front wheels 8. The power transmission unit 161 includes a transaxle which is a transmission integrated with a differential gear. A rear wheel driving unit 11B that drives the rear wheel 9 has the same configuration as the front wheel driving unit 10B. The conveyance machine 1 may travel by the traveling unit 5 illustrated in FIG. 9.

In the embodiment, the conveyance machine 1 can move in the +Y direction and the −Y direction. Thus in the example described above, when the conveyance machine 1 travels in the −Y direction, the rear section 6B functions as the front section, the rear wheel 9 functions as the front wheel, the front section 6A functions as the rear section, and the front wheel 8 functions as the rear wheel.

In the embodiment, the front wheel 8 and the rear wheel 9 each functions as a steering wheel. For example, when the conveyance machine 1 travels in the +Y direction, the front wheel 8 functions as the steering wheel, and when the conveyance machine 1 travels in the −Y direction, the rear wheel 9 functions as the steering wheel. Both the front wheel 8 and the rear wheel 9 may function as steering wheels at least in one of the case where the conveyance machine 1 moves in the +Y direction and the case where the conveyance machine 1 moves in the −Y direction.

Figure 10:
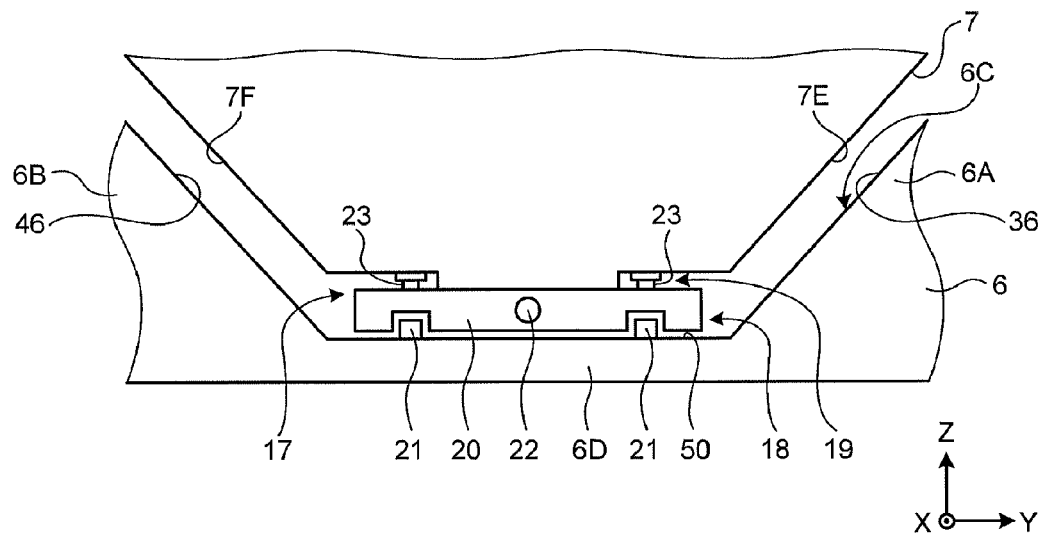
FIG. 10 is a schematic view illustrating an example of a supporting device according to the embodiment.

FIG. 10 is a schematic view illustrating an example of a supporting device 17 that supports the vessel 7. The supporting device 17 supports the vessel 7 in a manner allowing the vessel 7 to move. At least a portion of the supporting device 17 is positioned between the vehicle body 6 and the vessel 7. The supporting device 17 supports the vessel 7 in a manner allowing the vessel 7 to move relative to the vehicle body 6.

The supporting device 17 includes a slide mechanism 18 that moves the vessel 7 relative to the vehicle body 6 in X direction, and a side dump mechanism 19 that dumps a load from the vessel 7 in X direction. The side dump mechanism 19 tilts the vessel 7 about an axis parallel with Y direction to dump a load from the vessel 7.

The slide mechanism 18 includes a slide table 20 that is arranged between the vehicle body 6 (the bottom face 50 of the recessed section 6C) and the under face 7B of the vessel 7 and movable in X direction, a guide mechanism 21 that is arranged in the vehicle body 6 and guides the slide table 20 to move in X direction, and a hydraulic cylinder 22 that moves the slide table 20 in X direction. The hydraulic cylinder 22 is connected to at least a portion of the slide table 20. The hydraulic cylinder 22 operates to move the slide table 20 in X direction.

The vessel 7 is supported by the slide table 20. When the slide table 20 moves in X direction, the vessel 7 moves in X direction together with the slide table 20. Regarding X direction, the vessel 7 is movable in one direction (the +X direction) and in the other direction (the −X direction).

The side dump mechanism 19 includes a hoist cylinder 23 arranged between the slide table 20 and the vessel 7. As illustrated in FIG. 10, two hoist cylinders 23 may be arranged. The hoist cylinder 23 operates to lift up the vessel 7.

Figure 11:
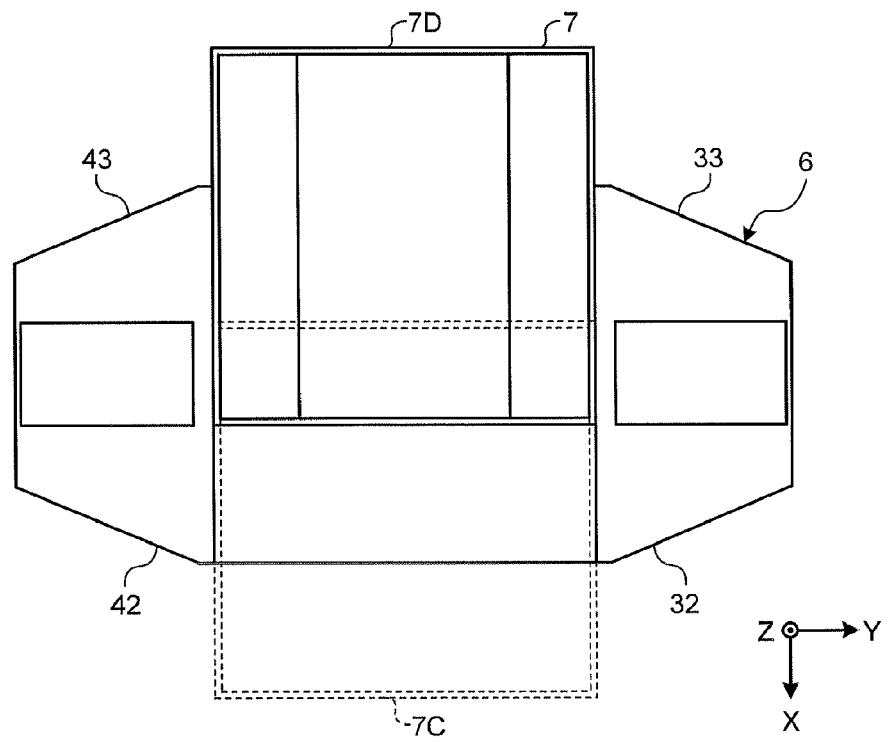
FIG. 11 is a schematic view illustrating an example of an operation of a vessel according to the embodiment.

FIG. 11 is a schematic view illustrating an example of the vessel 7 moved by the slide mechanism 18. In the embodiment, regarding X direction, the dimension of the vehicle body 6 and the dimension of the vessel 7 are approximately the same. Regarding X direction, when the vessel 7 and the vehicle body 6 are positioned so as the center of the vehicle body 6 is on the center of the vessel 7, the vessel 7 does not protrude in the outside of the vehicle body 6.

As illustrated in FIG. 11, the slide mechanism 18 can move the vessel 7 so that at least a portion of the vessel 7 stays in one side in X direction or in the other side in X direction of the vehicle body 6. That is, the slide mechanism 18 can move the vessel 7, using the hydraulic cylinder 22, in the +X direction so as the side face 7C of the vessel 7 to be positioned in the outside of the side face 32 and the side face 42 of the vehicle body 6. The slide mechanism 18 can move the vessel 7, using the hydraulic cylinder 22, in the −X direction so as the side face 7D of the vessel 7 to be positioned in the outside of the side face 33 and the side face 43 of the vehicle body 6. In this manner, the slide mechanism 18 can slide the vessel 7 in both directions in X direction.

Figure 12:
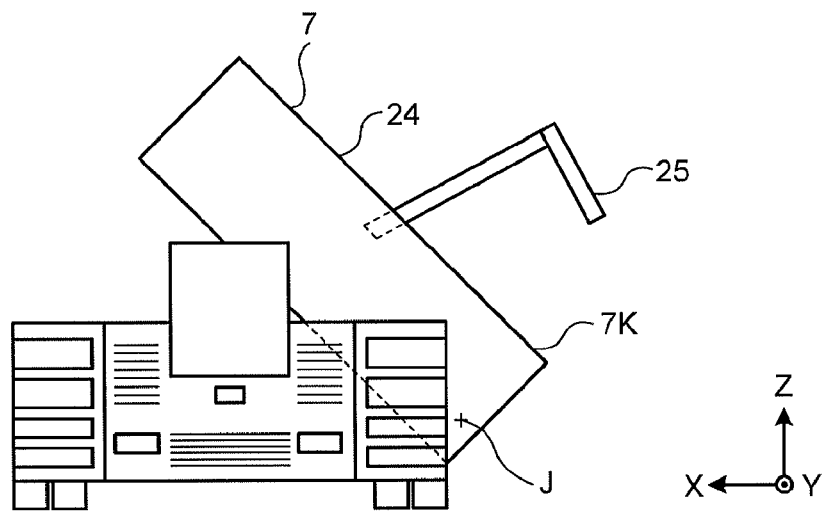
FIG. 12 is a schematic view illustrating an example of the operation of the vessel according to the embodiment.

FIG. 12 is a schematic view illustrating an example of the vessel 7 lifted up by the side dump mechanism 19. As illustrated in FIG. 11, the side dump mechanism 19 tilts the vessel 7 about an axis J that is parallel with Y direction. In the embodiment, the conveyance machine 1 dumps the load from the vessel 7 by side dumping. In the embodiment, the vessel 7 includes a vessel body 24 and a side gate 25 that rotates relative to the vessel body 24. The side gate 25 rotates in synchronization with tilting (rising) of the vessel body 24. By this motion, an opening 7K is created between the vessel body 24 and the side gate 25. The load on the vessel 7 is dumped to the side of the conveyance machine 1 through the opening 7K. That the axis J, which is the rotation axis of the vessel 7, is parallel with Y direction means that the axis J is at least truly parallel with or substantially parallel with Y direction. The axis J may be non-parallel with Y direction. For example, the angle between the axis J and Y direction may be between 1 degree and 45 degrees.

In the embodiment, when the vessel 7 is not lifted, the supporting device 17 is positioned lower than the top of the front wheel 8 and the top of the rear wheel 9. That is, when the conveyance machine 1 is traveling in the drift DR, the supporting device 17 is positioned lower than the top of the front wheel 8 and the top of the rear wheel 9.

Figure 13:
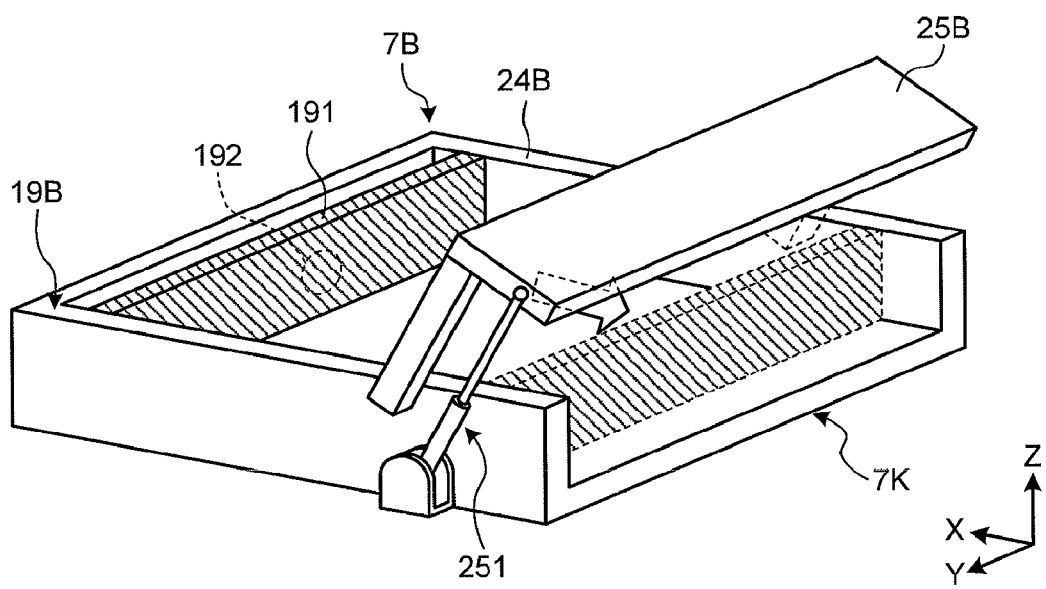
FIG. 13 is a schematic view illustrating an example of the operation of the vessel according to the embodiment.

FIG. 13 is a schematic view illustrating an example of a side dump mechanism 19B. The side dump mechanism 19B illustrated in FIG. 13 employs a so-called side ejector to dump the load from the vessel 7B in X direction. In FIG. 13, the vessel 7B includes a vessel body 24B and a side gate 25B that rotates relative to the vessel body 24B. The side gate 25B is rotated by the power of a cylinder mechanism 251. The side dump mechanism 19B includes a plate 191 arranged in the vessel body 24B and a driving unit 192 that moves the plate 191 in X direction. The driving unit 192 includes a multi-stage cylinder mechanism arranged between the vessel body 24B and the plate 191. When a load is dumped from the vessel 7, the cylinder mechanism 251 raises the side gate 25B. By this motion, an opening 7K is created between the vessel body 24B and the side gate 25B. The driving unit 192 moves the plate 191 in X direction (the −X direction in the example illustrated in FIG. 13) while the opening 7K is created. By this motion, the load on the vessel 7B is dumped to the side of the conveyance machine 1 through the opening 7K.

<Autonomous Traveling>

Figure 14:
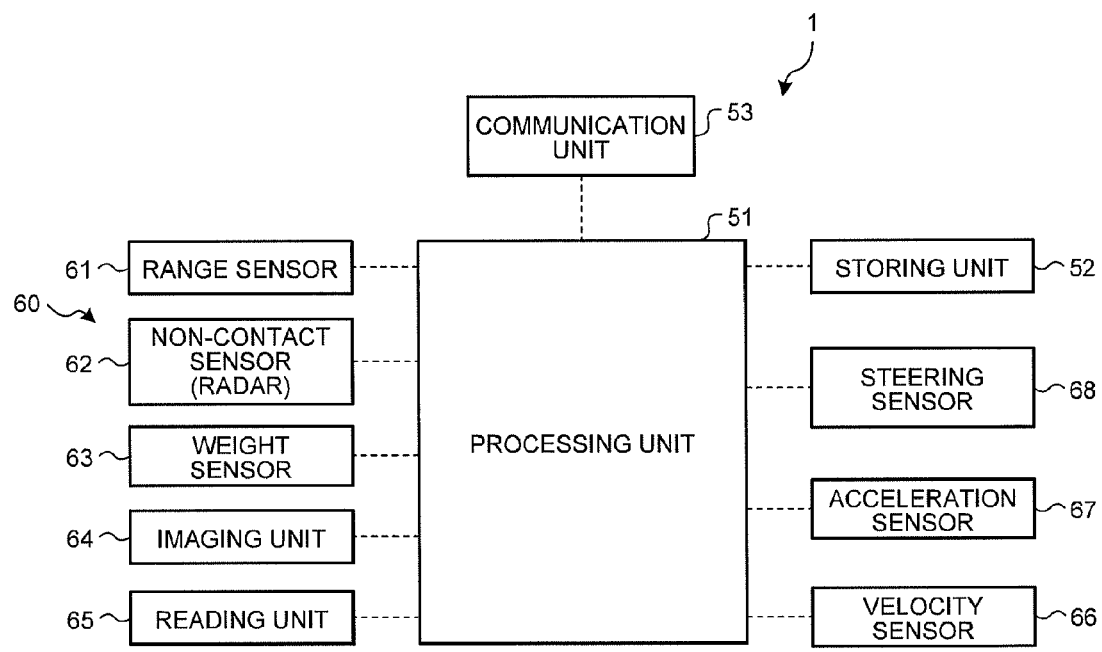
FIG. 14 is a block diagram illustrating an example of a processing unit and a detection system according to the embodiment.

The traveling of the conveyance machine 1 will now be described. In the embodiment, the conveyance machine 1 is an unmanned autonomous traveling vehicle that can travel autonomously. FIG. 14 is a function block diagram including a detection system 60 of the conveyance machine 1.

As illustrated in FIG. 14, the conveyance machine 1 includes a processing unit 51, a storing unit 52, a communication unit 53, and the detection system 60. The detection system 60 includes a range sensor 61 that outputs physical geometric data of a space, a non-contact sensor 62 that detects an obstacle, a weight sensor 63 that detects the weight of the vessel 7, an imaging unit 64 that obtains an optical image of an object and can detect the shape of the object, a reading unit 65 that detects a mark M (see FIG. 14) provided in the drift DR, a velocity sensor 66 that detects the traveling velocity of the conveyance machine 1, an acceleration sensor 67 that detects the acceleration or the angular velocity of the conveyance machine 1, and a steering sensor 68 that detects the steering angle of at least one of the front wheel 8 and the rear wheel 9.

The processing unit 51 includes a central processing unit (CPU). The processing unit 51 controls the traveling unit 5 according to the detected result of the detection system 60 so that the conveyance machine 1 moves to a determined target point. The processing unit 51 controls the electric motor 16 (the driving unit) and the braking system of the traveling unit 5 as well as the steering angle of at least one of the front wheel 8 and the rear wheel 9 so as the traveling unit 5 to be controlled to travel at a predetermined traveling velocity and a predetermined acceleration along a predetermined path (a target path) CS.

The storing unit 52 includes at least one of a random access memory (RAM), a read only memory (ROM), a flash memory, and a hard disk drive and is connected to the processing unit 51. The storing unit 52 stores various types of information necessary for autonomous traveling.

The communication unit 53 is connected to the processing unit 51 and communicates data with one or both of the loading machine 2 and the control station 3. The control station 3 communicates with the communication unit 53 of the conveyance machine 1 via the communication system 4. The communication unit 53 wirelessly communicates with the control station 3 via a relay unit 4A provided in the mine tunnel. The communication unit 53 can communicates data with the communication unit provided in the loading machine 2. The communication unit 53 can receive information (including a command signal) sent from at least one of the control station 3 and the loading machine 2. The communication unit 53 can send the information detected by the detection system 60 to at least one of the control station 3 and the loading machine 2.

The range sensor 61 includes a scanning optical-wave range meter that can output the physical geometric data of a space. The range sensor 61 includes at least one of a laser scanner and a 3-dimensional range sensor and can obtain 3-dimensional spatial data. The range sensor 61 detects at least one of the loading machine 2 and the wall of the drift DR. In the embodiment, the range sensor 61 can obtain at least one of the geometric data of the loading machine 2, the geometric data of the wall of the drift DR, and the geometric data of the load on the vessel 7. The range sensor 61 can detect at least one of the relative position to the loading machine 2 (the relative distance and bearing) and the relative position to the wall of the drift DR. That is, the range sensor 61 can function as at least one of a load detecting unit (a shape detecting unit) that detects the condition of a load (the shape of a load) on the vessel 7, a loading machine detecting unit (a first detecting unit) that detects the loading machine 2, and the second detecting unit that detects the drift DR (the mine tunnel R). The range sensor 61 is connected to the processing unit 51 and outputs the detected result to the processing unit 51. The range sensor 61 may include a radar.

In the embodiment, the information on the wall of the drift DR is obtained in advance and stored in the storing unit 52. That is, the information on the wall of the drift DR is the known information previously measured. The information on the wall of the drift DR includes the information on the shape and the absolute position of each of a plurality of portions of the wall. The storing unit 52 stores the relationship between the shape and the absolute position of each of a plurality of portions of the wall. The processing unit 51 can obtain the absolute position and the bearing of the conveyance machine 1 in the drift DR according to the detected wall of the drift DR (geometric data of the wall) detected by the range sensor 61 provided in the conveyance machine 1 and the stored information in the storing unit 52. In this manner, the range sensor 61 can function as a position detecting unit that detects the position of the conveyance machine 1 that travels in the drift CR (the mine tunnel R).

The processing unit 51 can control the traveling unit 5 in the drift DR according to the present position (the absolute position) of the conveyance machine 1 derived using the range sensor 61 so as the conveyance machine 1 to travel along the predetermined path CS.

The non-contact sensor 62 detects an obstacle ahead of the conveyance machine 1. The non-contact sensor 62 includes a radar. By emitting at least one of radio waves and ultrasonic waves and receiving radio waves reflected on an obstacle, the non-contact sensor 62 can detect the relative distance and bearing to the obstacle. The non-contact sensor 62 may include at least one of a laser scanner and a 3-dimensional range sensor. The non-contact sensor 62 is connected to the processing unit 51 and outputs the detected result to the processing unit 51.

The weight sensor 63 detects the weight of the vessel 7. The weight sensor 63 can detect the weight of the vessel 7 as well as the weight of the load on the vessel 7. That is, the weight sensor 63 can function as a load detecting unit (a weight detecting unit) that detects the condition of load on the vessel 7 (the weight of the vessel 7). The weight sensor 63 is connected to the processing unit 51 and outputs the detected result to the processing unit 51. The processing unit 51 obtains information on the weight of the load on the vessel 7 and whether the vessel 7 is loaded according to the detected result of the weight sensor 63. The weight sensor 63 may include, for example, a strain gauge load cell provided between the slide table 20 and the vessel 7 and a pressure sensor for detecting the hydraulic pressure in the hoist cylinder 23.

The imaging unit 64 includes an imaging element such as a CCD and can obtain an optical image of an object to detect the shape of the object. In the embodiment, the imaging unit 64 includes a stereo camera and can obtain a 3-dimensional shape data of the object. The imaging unit 64 can detect the shape (the loaded form) of the load on the vessel 7. That is, the imaging unit 64 can function as a load detecting unit (the shape detecting unit) that detects the condition of the load on the vessel 7 (the shape of the vessel 7). The imaging unit 64 is connected to the processing unit 51 and outputs the detected result to the processing unit 51. The processing unit 51 obtains information on the condition of the load on the vessel 7 according to the detected result of the imaging unit 64. The shape of the load on the vessel 7 may be detected using at least one of a laser scanner and a 3-dimensional range sensor.

The reading unit 65 detects a mark M provided in the drift DR. A plurality of marks M is provided along the drift DR. The mark M may be an identifier (a code), such as a bar code and a 2-dimensional code, or an identifier (a tag), such as an IC tag and an RFID. The reading unit 65 detects the identification information or a unique information of the mark M. The reading unit 65 is connected to the processing unit 51 and outputs the detected result to the processing unit 51.

In the embodiment, the information on the position (the absolute position) of the mark M in the drift DR is the known information previously measured. The information on the absolute position of the mark M is stored in the storing unit 52. The processing unit 51 can obtain the absolute position of the conveyance machine 1 in the drift DR according to the identification information or the unique information of the mark M, which is the result of detection of the mark M by the reading unit 65 provided in the conveyance machine 1, and the stored information in the storing unit 52. That is, the reading unit 65 can function as a position detecting unit that detects the position of the conveyance machine 1 that travels in the drift DR (the mine tunnel R). The reading unit 65 functions as the second detecting unit that detects the mark M provided in the drift DR (the mine tunnel R).

The processing unit 51 can control the traveling unit 5 in the drift DR according to the present position (the absolute position) of the conveyance machine 1 derived using the reading unit 65 so as the conveyance machine 1 to travel along the predetermined path CS.

The mark M may be a structure like a landmark. If the mark M is a landmark, the reading unit 65 may include a radar. By emitting radio waves from the radar and receiving at least a part of radio waves reflected on the landmark, the reading unit 65 can detect the distance and bearing relative to the landmark. When the position (the absolute position) of the landmark is known and the information on the absolute position of the landmark is stored in the storing unit 52, the processing unit 51 can obtain the absolute position of the conveyance machine 1 in the drift DR according to the value detected by the reading unit 65 provided in the conveyance machine 1 and the stored information in the storing unit 52.

The velocity sensor 66, the acceleration sensor 67, and the steering sensor 68 are each connected to the processing unit 51. The velocity sensor 66 outputs the detected traveling velocity of the conveyance machine 1 to the processing unit 51. The acceleration sensor 67 outputs the detected acceleration of the conveyance machine 1 to the processing unit 51. The steering sensor 68 outputs the detected steering angle of at least one of the front wheel 8 and the rear wheel 9 to the processing unit 51.

In the embodiment, the processing unit 51 can make the traveling unit 5 travel by dead reckoning using, for example, values detected by the velocity sensor 66 and the steering sensor 68. That is, the processing unit 51 can control the traveling unit 5 in the drift DR by estimating the present position of the conveyance machine 1 by dead reckoning so as the conveyance machine 1 to travel along the predetermined path CS.

The dead reckoning is a navigation method in which the present position of an object (the conveyance machine 1) is estimated according to the bearing (the changed amount of bearing) and the travel distance from a reference point (the point of origin) of which absolute position is known. The bearing of the conveyance machine 1 is detected using the steering sensor 68 arranged in the conveyance machine 1. The travel distance of the conveyance machine 1 is detected using the velocity sensor 66 arranged in the conveyance machine 1. The values detected by the steering sensor 68 and the velocity sensor 66 are output to the processing unit 51 of the conveyance machine 1. The processing unit 51 can obtain the bearing of the conveyance machine 1 from the known reference point according to the value detected by the steering sensor 68. The processing unit 51 can obtain the travel distance of the conveyance machine 1 from the known reference point according to the value detected by the velocity sensor 66. In this manner, the detection system 60 including the steering sensor 68 and the velocity sensor 66 can detect by dead reckoning the relative position of the conveyance machine 1 to the reference point. That is, in the embodiment, the velocity sensor 66 and the steering sensor 68 function as relative position detecting units that detects by dead reckoning the relative position to the reference point. The processing unit 51 controls the traveling unit 5 according to the value detected by the steering sensor 68 and the value detected by the velocity sensor 66 so as the conveyance machine 1 to travel along the given path CS. The bearing (the changed amount of bearing) of the conveyance machine 1 may be detected by a gyro sensor provided in the conveyance machine 1.

The processing unit 51 may correct, according to the information on the absolute position of the conveyance machine 1 in the drift DR obtained using one or both of detected results of the range sensor 61 and the reading unit 65, the relative position of the conveyance machine 1 to the reference point detected by dead reckoning. That is, when the travel distance of the conveyance machine 1 increases, the detection error of one or both of the steering sensor 68 and the velocity sensor 66 accumulates and therefore an error might occur between the position estimated (the estimated position) and the actual position. As a result, the conveyance machine 1 might travel out of the path CS. In the embodiment, the processing unit 51 may correct, while controlling the traveling unit 5, the position (the estimated position) of the conveyance machine 1 derived (estimated) by dead reckoning using the information on the absolute position of the conveyance machine 1 obtained from at least one of detected results of the range sensor 61 and the reading unit 65. The processing unit 51 calculates control amounts related to the traveling of the conveyance machine 1, including a correction amount of the position of the conveyance machine 1, according to the value detected by the steering sensor 68, the value detected by the velocity sensor 66, and the information on the absolute position of the conveyance machine 1 so as the conveyance machine 1 to travel along the path CS. The processing unit 51 controls the traveling unit 5 according to the calculated correction amount and the control amount so as the conveyance machine 1 to travel along the path CS.

Figure 15:
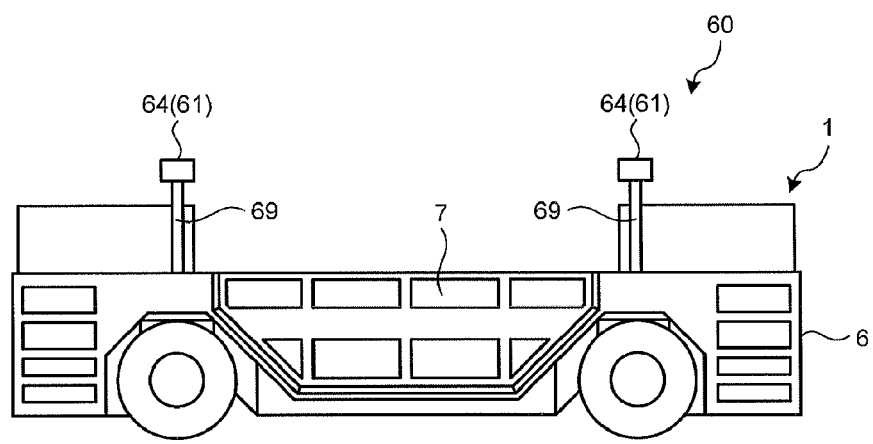
FIG. 15 is a schematic view illustrating an example of a detection system according to the embodiment.

FIG. 15 is a schematic view illustrating an example of the detection system 60 mounted on the conveyance machine 1. As illustrated in FIG. 15, the imaging unit (the load detecting unit, or the shape detecting unit) 64 is supported on the vehicle body 6 via a supporting device 69. The imaging unit 64 is arranged in a position from which the shape of the load on the vessel 7 can be detected. As described above, the shape of the load on the vessel 7 may be detected using, in place of or together with the imaging unit 64, the range sensor 61 including at least one of a laser scanner and a 3-dimensional range sensor. That is, the range sensor 61 may be supported by the supporting device 69.

The imaging unit 64 may be arranged at a predetermined location on the vehicle body 6 from which an optical image of the loading machine 2 can be obtained, or at a predetermined location on the vehicle body 6 from which an optical image (3-dimensional geometric data) of the wall of the drift DR can be obtained. In this case, the imaging unit 64 functions as at least one of the loading machine detecting unit (the first detecting unit) for detecting the loading machine 2 and the second detecting unit for detecting the drift DR (the mine tunnel R).

Figure 16:
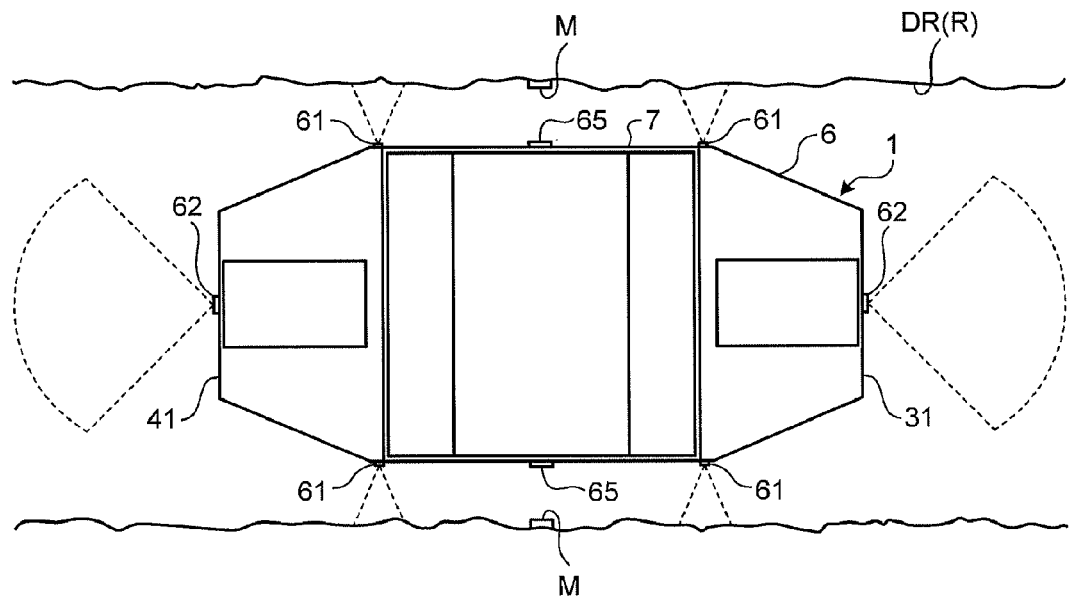
FIG. 16 is a schematic view illustrating an example of the detection system according to the embodiment.

FIG. 16 is a schematic view illustrating an example of the detection system 60 mounted on the conveyance machine 1. As illustrated in FIG. 16, the non-contact sensor 62 for detecting an obstacle may be provided on one or both of the front face 31 and the rear face 41 of the vehicle body 6.

The range sensor (the second detecting unit, the position detecting unit, the loading machine detecting unit, and the first detecting unit) 61 that can detect at least one of the geometric data of the loading machine 2, the geometric data of the wall of the drift DR, the relative position to the loading machine 2, and the relative position to the wall of the drift DR is provided at a predetermined location on the vehicle body 6. In the example illustrated in FIG. 16, the range sensor 61 is provided on a side face of the vehicle body 6 in a manner that at least one of the geometric data of the wall of the drift DR and the relative position to the wall of the drift DR can be detected. The range sensor 61 may be provided on at least one of the top face, side faces, the front face, and the rear face of the vehicle body 6 in a manner that at least one of the geometric data of the loading machine 2 and the relative position to the loading machine 2 can be detected.

The reading unit (the position detecting unit, or the second detecting unit) 65 is provided at a predetermined position on the vehicle body 6, such as a side face of the vehicle body 6, in a manner that the mark M provided on the wall of the drift DR can be detected.

<Management Unit>

Figure 17:
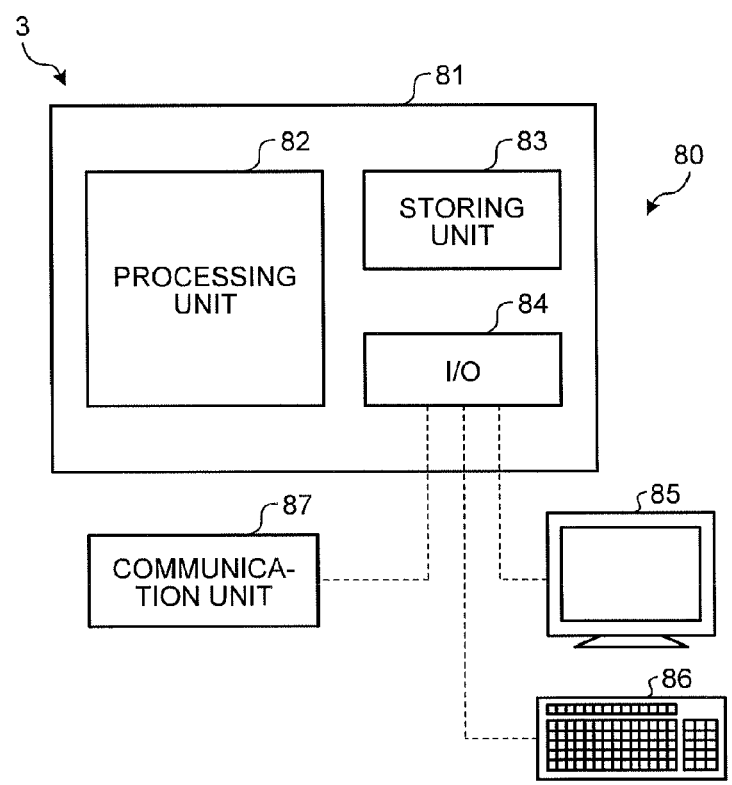
FIG. 17 is a block diagram illustrating an example of a management unit according to the embodiment.

A management unit 80 provided in the control station 3 will now be described. FIG. 17 is a block diagram illustrating an example of the management unit 80 according to the embodiment. As illustrated in FIG. 17, the management unit 80 includes a computer system 81, a display unit 85, an input unit 86, and a communication unit 87.

The computer system 81 includes a processing unit 82, a storing unit 83, and an input/output unit 84. The display unit 85, the input unit 86, and the communication unit 87 are connected to the computer system 81 via the input/output unit 84. The input/output unit 84 is used as an input/output (an interface) information for at least one of the processing unit 82, the display unit 85, the input unit 86, and the communication unit 87.

The processing unit 82 includes a CPU and executes various types of processing related to management of mining machines including the conveyance machine 1 and the loading machine 2. The processing unit 82 processes information on the position of the conveyance machine 1 obtained via the communication system 4. The processing unit 82 generates the path CS which the conveyance machine 1 travels. The path CS is generated in the absolute position coordinate system. The conveyance machine 1 travels in at least a portion of the mine tunnel R along the path CS generated by the processing unit 82.

The storing unit 83 includes at least one of a RAM, a ROM, a flash memory, and a hard disk drive and stores various types of information related to the management of the mining machine. The display unit 85 includes a flat panel display, such as a liquid crystal display, and can present information on the position of the mining machine. The input unit 86 includes at least one of a keyboard, a touch panel, a mouse, and an operating switch. The input unit 86 is manipulated to generate a manipulation signal and input the manipulation signal to the processing unit 82.

The communication system 4 includes a communication unit 87 provided in the control station 3. The communication unit 87 is connected by wire to the relay unit 4A. The processing unit 82 can send various types of information, such as information on the path CS, from the communication unit 87 to the conveyance machine 1. At least one of the information on the position of the conveyance machine 1 and the information on the condition of the load detected by the detection system 60 of the conveyance machine 1 is received via the communication unit 87 and stored in the storing unit 83.

<Operation of Conveyance Machine>

Figure 18:
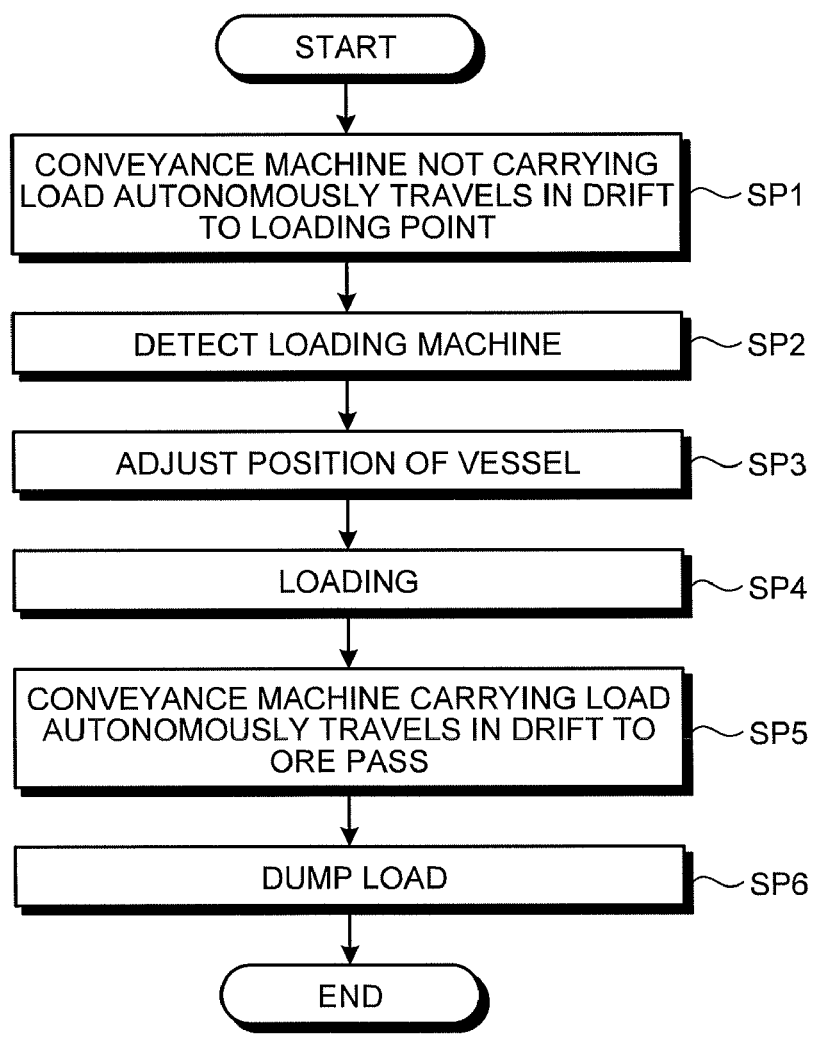
FIG. 18 is a flowchart illustrating an example of an operation of the conveyance machine according to the embodiment.

An example of the operation of the conveyance machine 1 will now be described referring to FIG. 18. FIG. 18 is a flowchart illustrating an example of an operation of the conveyance machine 1 according to the embodiment. The conveyance machine 1 not carrying a load (in the unloaded state) travels in the drift DR that leads to the loading point LP for loading (Step SP1). When the conveyance machine 1 is traveling in the drift DR, the center of the vessel 7 is on the center of the vehicle body 6, regarding X direction, and the vessel 7 is not lifted. The information on the path CS is sent from the management unit 80 via the communication system 4 to the conveyance machine 1. The information is stored in the storing unit 52 of the conveyance machine 1. The path CS is based on the absolute position. The processing unit 51 of the conveyance machine 1 controls the traveling unit 5 so as the conveyance machine 1 to travel in the drift DR along the path CS generated by the management unit 80. The conveyance machine 1 autonomously travels in the drift DR leading to the loading point LP so as the vessel 7 to be positioned at the loading point LP, which is the target point.

As described above, the processing unit 51 can derive the absolute position of the conveyance machine 1 in the drift DR according to the detected result of at least one of the range sensor 61 and the reading unit 65 and the stored information in the storing unit 52. The processing unit 51 of the conveyance machine 1 controls the traveling unit 5 so as the conveyance machine 1 to travel in the drift DR along the path CS to the loading point LP. The processing unit 51 controls the traveling unit 5 in the drift DR leading to the loading point LP according to the detected result of at least one of the range sensor 61 and the reading unit 65 so as the vessel 7 to be positioned at the loading point LP.

The range sensor 61 can detect the relative position to the wall of the drift DR. The processing unit 51 controls the traveling unit 5 according to the detected result of the range sensor 61 so as the conveyance machine 1 to travel along the wall of the drift DR. The processing unit 51 controls the traveling unit 5, for example, so as the conveyance machine 1 not to touch the wall of the drift DR when traveling in the drift DR.

Note that, the conveyance machine 1 is allowed to touch the wall of the drift DR. For example, when the conveyance machine 1 passes a portion where the width (the path width) of the drift DR is small or turns a curve in the drift DR, the conveyance machine 1 may touch the wall of the drift DR while traveling. A guiding member (e.g., a guide rail) may be provided in a corner of the drift DR and a guided part (e.g., a roller) that is guided by the guiding member may be provided on the conveyance machine 1 so that the conveyance machine 1 turns the corner of the drift DR with the guiding member touching the guided part.

In the embodiment, the conveyance machine 1 travels in the drift DR in the $+Y_0$ direction to enter the loading point LP. When the conveyance machine 1 has arrived near the loading point LP, the processing unit 51 controls the traveling unit 5 to stop (halt) the conveyance machine 1. After the conveyance machine 1 has arrived near the loading point LP, the processing unit 51 uses the range sensor 61 to detect the loading machine 2 (Step SP2). The processing unit 51 uses the range sensor 61 to obtain the shape data of the loading machine 2 and detect the relative position between the conveyance machine 1 and the loading machine 2. The processing unit 51 adjusts the position of the vessel 7 according to the detected result of the range sensor 61 so as the vessel 7 to be positioned at the loading point LP where the loading machine 2 performs loading.

By obtaining the shape data of the loading machine 2 and detecting the relative position to the loading machine 2, the processing unit 51 can set the vessel 7 at the position suitable for loading operation. The processing unit 51 positions the vessel 7 at the loading point LP according to the detected result of the range sensor 61 so as the conveyance machine 1 including the vessel 7 not to touch the loading machine 2.

Figure 19:
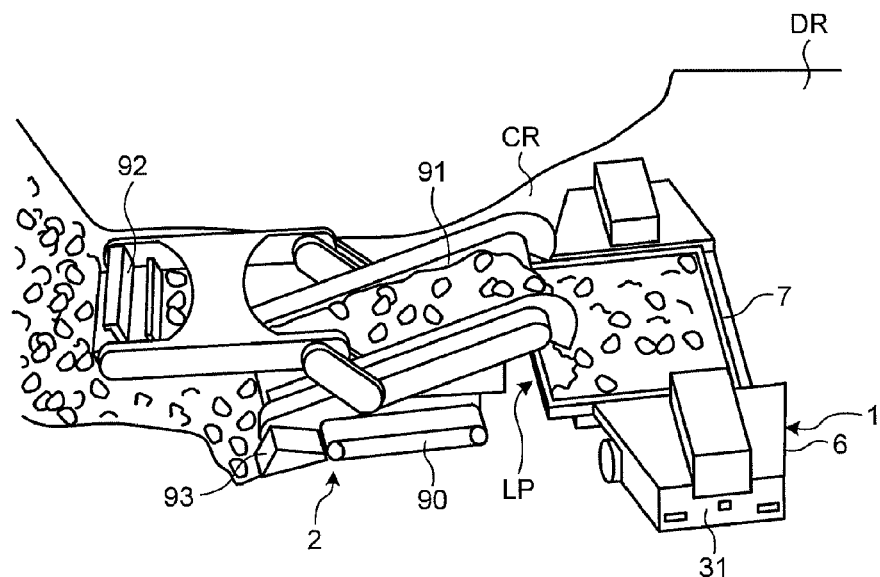
FIG. 19 is a perspective view illustrating an example of a state in which the conveyance machine is loaded with a load by a loading machine according to the embodiment.
Figure 20:
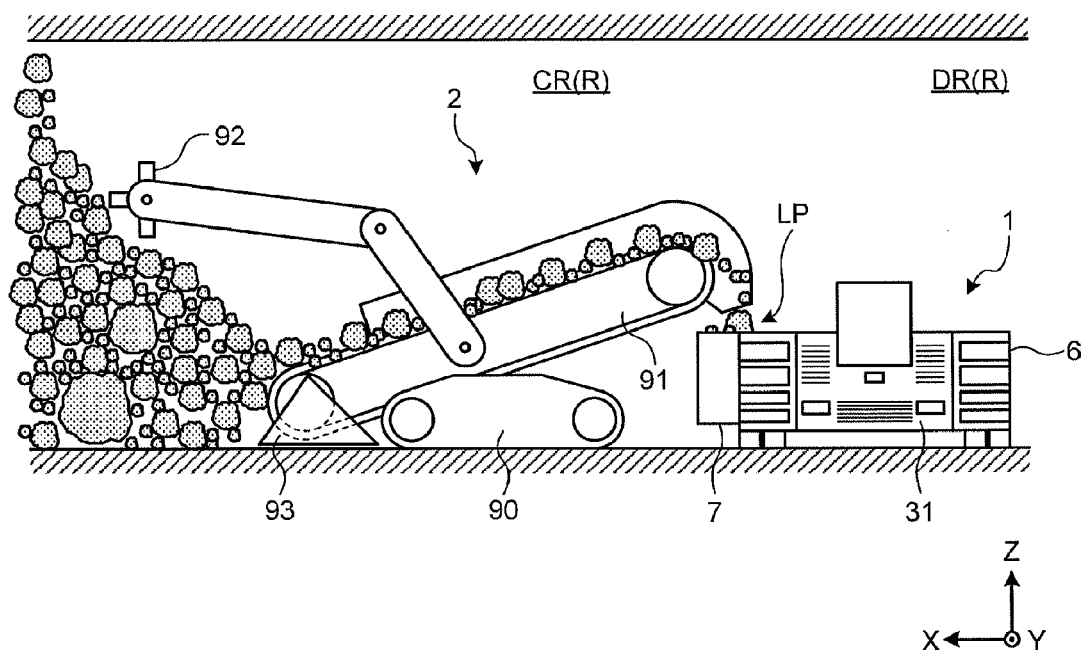
FIG. 20 is a side view illustrating an example of the state in which the conveyance machine is loaded with a load by the loading machine according to the embodiment.

FIG. 19 is a perspective view and FIG. 20 is a side view each illustrating an example of the state where the loading machine 2 is loading a load on the vessel 7. In FIG. 19 and FIG. 20, the loading machine 2 includes a lower traveling body 90 including a crawler, a feeder unit 91 that is supported on the lower traveling body 90 and can supply ore, or a load, to the vessel 7, a shoveling unit 92 that shovels in a load to the feeder unit 91, and a shoving member 93 that shoves into a pile of ore.

The feeder unit 91 includes an inclined conveyer. The feeder unit 91 transports a load from the front part to the rear part of the feeder unit 91. In the embodiment, the front part of the feeder unit 91 is positioned lower than the rear part of the feeder unit 91. The load shoveled into the front part (the lower part) of the feeder unit 91 is raised by the feeder unit 91 to be supplied to the vessel 7 from the rear part (a supplying part, or an upper part) of the feeder unit 91. In the embodiment, the loading point LP includes the position below the supplying part of the feeder unit 91.

In the embodiment, while the traveling unit 5 is controlled according to the detected result of the range sensor 61 so as the conveyance machine 1 and the loading machine 2 not to touch each other, at least a portion of the conveyance machine 1 enters the space below the supplying part of the feeder unit 91. In the embodiment, the top face 34A and the top face 44A are positioned low and near the feeder unit 91 when the vessel 7 enters the loading point LP, so that the chances of the vehicle body 6 touching the feeder unit 91 is suppressed.

As illustrated in FIGS. 19 and 20, the processing unit 51 adjusts the position of the vessel 7 so as the vessel 7 to be below the supplying part of the feeder unit 91 (Step SP3). In the embodiment, when a load is loaded on the vessel 7, the vessel 7 is moved by the slide mechanism 18 so that at least a portion of the vessel 7 is positioned in the outside of the vehicle body 6. In the embodiment, the loading machine 2 is positioned in the +X side of the conveyance machine 1 that has moved in the drift DR in the $+Y_0$ direction. The processing unit 51 uses the range sensor 61 to detect the relative position between the conveyance machine 1 and the loading machine 2. According to the detected result, the processing unit 51 controls the slide mechanism 18 so as the vessel 7 to be positioned below the supplying part of the feeder unit 91 that is positioned in the +X side of the conveyance machine 1. The processing unit 51 controls the slide mechanism 18 according to the detected result of the range sensor 61 to move the vessel 7 in the +X direction, thereby adjusting the position of the vessel 7 to the loading machine 2. In the embodiment, when the position of the vehicle body 6 fixed, the processing unit 51 uses the slide mechanism 18 to move the vessel 7 so as the vessel 7 to be positioned at the loading point LP.

The processing unit 51 may adjust the position of the vessel 7 by controlling the traveling unit 5 to move the vehicle body 6 when adjusting the position of vessel 7 so as the vessel 7 to be positioned at the loading point LP To set the vessel 7 at the optimum position, the processing unit 51 may control both the traveling unit 5 and the slide mechanism 18 to move the vehicle body 6 relative to the path floor and move the vessel 7 relative to the vehicle body 6.

With the vessel 7 set at the optimum position to the feeder unit 91, a load is supplied from the feeder unit 91 to the vessel 7. Now the loading machine 2 loads a load on the vessel 7 (Step SP4). By adjusting the position of the vessel 7, spill of a load (fall of a load) is suppressed.

Figure 21:
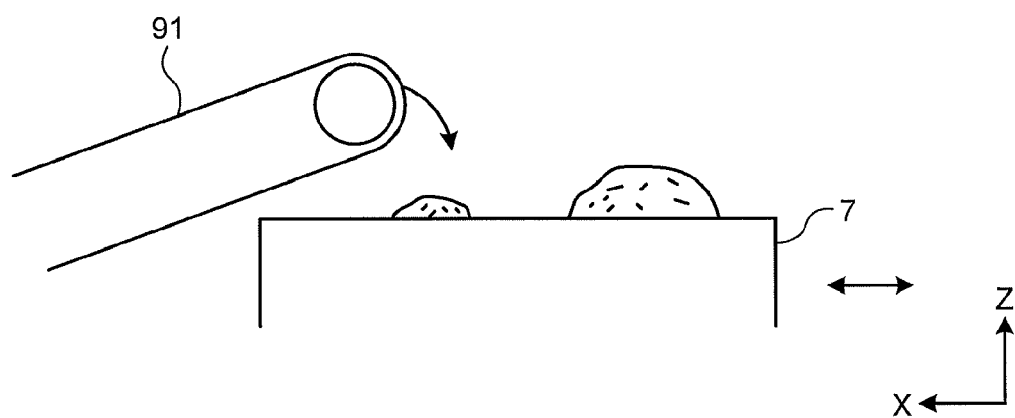
FIG. 21 is a schematic view illustrating an example of a state in which the vessel is loaded with a load by the loading machine according to the embodiment.

FIG. 21 is a schematic diagram illustrating an example of supplying a load from the feeder unit 91 to the vessel 7. The ore supplied from the feeder unit 91 may be loaded unevenly on the vessel 7, like being piled up on a portion of the vessel 7 as illustrated in FIG. 21. As described with reference to FIGS. 14 and 15, the conveyance machine 1 of the embodiment includes the imaging unit 64 that can detect the condition of the load on the vessel 7. In the embodiment, the processing unit 51 can control the slide mechanism 18 according to the detected result of the imaging unit 64 to adjust the position of the vessel 7. The imaging unit 64 can detect the shape of the load on the vessel 7. If the processing unit 51 determines according to the detected result of the imaging unit 64 that the load is unevenly loaded on the vessel 7, the processing unit 51 moves the vessel 7 in X direction to adjust the position of the vessel 7 to the feeder unit 91 of the loading machine 2 so that the unevenness is moderated. In the example illustrated in FIG. 21, the load is partially loaded to the end of the vessel 7 in the −X side, so the processing unit 51 moves the vessel 7 in the −X direction to moderate unevenness. Now a load is supplied from the feeder unit 91 to the end of the vessel 7 in the +X side to moderate unevenness of the load on the vessel 7.

The position of the vessel 7 to the loading machine 2 may be adjusted by moving the vessel 7 in X direction by the slide mechanism 19 according to the detected result of the weight sensor 63 that can detect the weight of the vessel 7. For example, the vessel 7 may be moved a predetermined distance in X direction each time when the weight sensor 63 detects a predetermined amount of increase in weight. If the relationship between the weight of the vessel 7 and the corresponding shape of the load (the loaded form) is known, the processing unit 51 may move the vessel 7 according to the detected result of the weight sensor 63 so as the loaded form of the load to be suitable.

For example, if the weight sensor 63 that can detect the weight of the vessel 7 can detect the condition of the load on the vessel 7, the vessel 7 may be moved in X direction by the slide mechanism 18 according to the detected result of the weight sensor 63. For example, if the weight sensor 63 can detect an uneven weight on the vessel 7 caused by an uneven load, the processing unit 51 may move the vessel 7 in X direction to moderate the unevenness.

The processing unit 51 may control the slide mechanism 18 to move (sway) the vessel 7 back and forth in X direction. For example, when a load is unevenly loaded or piled up high on the vessel 7, the load can be leveled by moving the vessel 7 back and forth. By leveling the load, the loading capability of the vessel 7 can be raised.

The processing unit 51 may determine the distance of moving the vessel 7 back and forth according to the detected result of the imaging unit 64. For example, when the processing unit 51 determines according to the detected result of the imaging unit 64 that a load is piled up high, the processing unit 51 may move the vessel 7 back and forth by a large distance. When the processing unit 51 determines according to the detected result of the imaging unit 64 that a plurality of portions of load is piled up, the processing unit 51 may move the vessel 7 back and forth by a small distance.

The processing unit 51 may decrease the moving speed of the vessel 7 when the distance of moving back and forth is large and increase the moving speed of the vessel 7 when the distance of moving back and forth is small. In this manner, the load can be leveled efficiently.

The processing unit 51 may determine whether to move the vessel 7 back and forth or determine one or both of the distance and the speed of moving back and forth according to the detected results of the imaging unit 64 that detects the shape of the load on the vessel 7 and the weight sensor 63 that detects the weight of the vessel 7. For example, when it is determined that the vessel 7 is fully loaded according to the detected result of the imaging unit 64 but not yet fully loaded according to the detected result of the weight sensor 63, it is estimated that many spaces exist between fractions of ore loaded on the vessel 7. When the processing unit 51 determines that many spaces exist between fractions of ore according to the detected result of the imaging unit 64 and the detected result of the weight sensor 63, the processing unit 51 controls the slide mechanism 18 to move the vessel 7 back and forth. In this manner, the load can be leveled and the spaces are eliminated, thereby increasing the loading capability.

The vessel 7 may be moved back and forth in parallel with at least a part of the operation of supplying a load from the feeder unit 91 to the vessel 7. That is, the slide mechanism 18 may move the vessel 7 back and forth in the period when the load is loaded on the vessel 7. The vessel 7 may be moved back and forth after a load has been supplied from the feeder unit 91 to the vessel 7. That is, the slide mechanism 18 may move the vessel 7 back and forth in a period after the load has been loaded on the vessel 7.

When the loading operation is finished, the conveyance machine 1 carrying the load (in the loaded state) travels in the drift DR that leads to the ore pass OP to dump the load (Step SP5). The conveyance machine 1 that has departed the loading point LP moves in the $+Y_0$ direction in the drift DR. When the conveyance machine 1 is traveling in the drift DR, the center of the vessel 7 is on the center of the vehicle body 6, regarding X direction, and the vessel 7 is not lifted. The processing unit 51 controls the traveling unit 5 so as the conveyance machine 1 to travel in the drift DR along the path CS generated by the management unit 80. The conveyance machine 1 autonomously travels in the drift DR leading to the ore pass OP so as the vessel 7 to be positioned at the ore pass OP, which is the target point.

When the conveyance machine 1 is moving to the ore pass OP, the processing unit 51 derives the absolute position of the conveyance machine 1 in the drift DR according to the detected result of at least one of the range sensor 61 and the reading unit 65 and the stored information in the storing unit 52 and controls the traveling unit 5 so as the conveyance machine 1 to travel in the drift DR along the path CS to the ore pass OP. The processing unit 51 controls the traveling unit 5 in the drift DR leading to the ore pass OP according to the detected result of at least one of the range sensor 61 and the reading unit 65 so as the vessel 7 to be positioned at the ore pass OP. The processing unit 51 controls the traveling unit 5 according to the detected result of the range sensor 61 so as the conveyance machine 1 to travel along the drift DR. For example, the processing unit 51 controls the traveling unit 5 so as the conveyance machine 1 not to touch the wall of the drift DR when traveling in the drift DR.

Figure 22:
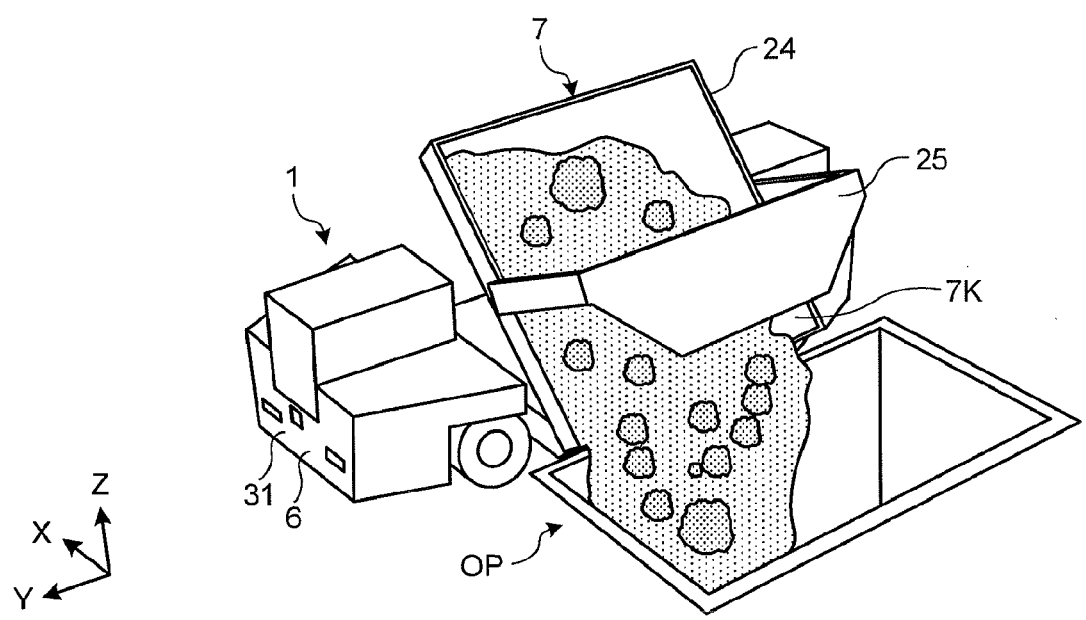
FIG. 22 is a figure illustrating an example of a state in which the conveyance machine according to the embodiment is dumping a load.

FIG. 22 is a figure illustrating an example of the state where a load is dumped from the vessel 7 at the ore pass OP. When the conveyance machine 1 has arrived to the ore pass OP, the processing unit 51 operates the side dump mechanism 19 to lift the vessel 7. In this operation, as illustrated in FIG. 22, the side gate 25 swings as the vessel 7 rises, and the opening 7K is created between the vessel body 24 and the side gate 25. The load on the vessel 7 is dumped from the vessel 7 through the opening 7K (Step SP6). In the example illustrated in FIG. 22, the vessel 7 is lifted so that the load is dumped to the −X side of the vehicle body 6.

When dumping the load from the vessel 7, the processing unit 51 may operate the slide mechanism 18 to move the vessel 6 so that at least a portion of the vessel 7 is positioned in the outside of the vehicle body 6. For example, the processing unit 51 may operate the slide mechanism 18 to move the vessel 7 in the −X direction and then operate the side dump mechanism 19 to lift the vessel 7. The processing unit 51 may lift the vessel 7 while moving the vessel 7 in the −X direction.

When dumping of the load is finished, the conveyance machine 1, in the unloaded state, starts traveling to head for the loading point LP for loading operation. The conveyance machine 1 repeats the processes described above.

In the example illustrated in FIGS. 19 and 20, the conveyance machine 1 that moves in the $+Y_0$ direction in the drift DR is loaded with a load by the loading machine 2 that is positioned in the cross-cut CR and in the +X side of the conveyance machine 1. As described with reference to figures, such as FIG. 3, a load may be loaded on the conveyance machine 1 from the loading machine 2 that is positioned in the cross-cut CR and in the −X side of the conveyance machine 1. For example, the vessel 7 may be positioned at the loading point LP in the −X side of the conveyance machine 1 that moves in the $+Y_0$ direction in the drift DR in the following manner. The processing unit 51 uses the range sensor 61 to detect the relative position between the conveyance machine 1 and the loading machine 2 positioned in the −X side of the conveyance machine 1, and controls the slide mechanism 18 according to the detected result to move the vessel 7 in the −X direction to adjust the position of the vessel 7 to the loading machine 2 so as the vessel 7 to be positioned below the supplying part of the feeder unit 91 of the loading machine 2. Also in this case, the top face 34B and the top face 44B are positioned low and near the feeder unit 91 when the vessel 7 enters the loading point LP, so that the chances of the vehicle body 6 touching the feeder unit 91 is suppressed. In the embodiment, since the conveyance machine 1 is right-left symmetric, the operation of loading a load from the +X side of the conveyance machine 1 and the operation of loading a load from the −X side of the conveyance machine 1 are performed smoothly. In this manner, the loading operation is performed smoothly from either of the right and left sides where the loading point LP is positioned with reference to the moving direction of the conveyance machine 1.

In the example of the embodiment described above, the conveyance machine 1 moves in the +Y direction in the drift DR to enter the loading point LP, by moving in the $+Y_0$ direction, and the loading on the conveyance machine 1 is performed. Then when the loading on the conveyance machine 1 is finished, the conveyance machine 1 moves in the $+Y_0$ direction from the loading point LP. It goes without saying that the conveyance machine 1 may move in the $-Y_0$ direction in the drift DR to enter the loading point LP, by moving in the $-Y_0$ direction, and the loading on the conveyance machine 1 is performed. Then when the loading on the conveyance machine 1 is finished, the conveyance machine 1 may move in the $-Y_0$ direction from the loading point LP. When the conveyance machine 1 moves in the $-Y_0$ direction, the rear section 6B may function as the front section and the rear traveling unit 5B may function as the front traveling unit. In this case, the loading point LP may be determined in the +X side or in the −X side of the conveyance machine 1. The vessel 7 may slide to the +X side when the loading point LP is determined in the +X side, and the vessel 7 may slide to the −X side when the loading point LP is determined in the −X side. The conveyance machine 1 may be loaded after the conveyance machine 1 that moves in the +$Y_0$ direction (or in the −$Y_0$ direction) in the drift DR has entered the loading point LP by moving in the +$Y_0$ direction (or in the −$Y_0$ direction), and after finishing the loading operation, the conveyance machine 1 may move in the −$Y_0$ direction (or in the +$Y_0$ direction) from the loading point LP. That is, the moving direction of the conveyance machine 1 may be switched between the case where the conveyance machine 1 enters the loading point LP to be loaded and the case where the conveyance machine 1 departs the loading point LP after the loading operation. In the embodiment, since the conveyance machine 1 is fore-aft symmetric, the conveyance machine 1 can travel smoothly in the moving direction switched between the +$Y_0$ direction and the −$Y_0$ direction.

Obstacle Detection

As described above in the embodiment, the conveyance machine 1 includes a non-contact sensor 62 that detects an obstacle. When the non-contact sensor 62 detects an obstacle in the drift DR when the conveyance machine 1 is traveling in the drift DR, the processing unit 51 outputs the detected result of the non-contact sensor 62 to the management unit 80 in the control station 3 via the communication system 4. For example, the management unit 80 may generate a path CS to circumvent the obstacle.

When the non-contact sensor 62 detects an obstacle ahead of the conveyance machine 1, the processing unit 51 may control the traveling unit 5 to make the conveyance machine 1 stop traveling, move backward, or travel in a manner circumventing the obstacle to avoid the conveyance machine 1 touching the obstacle.

Figure 23:
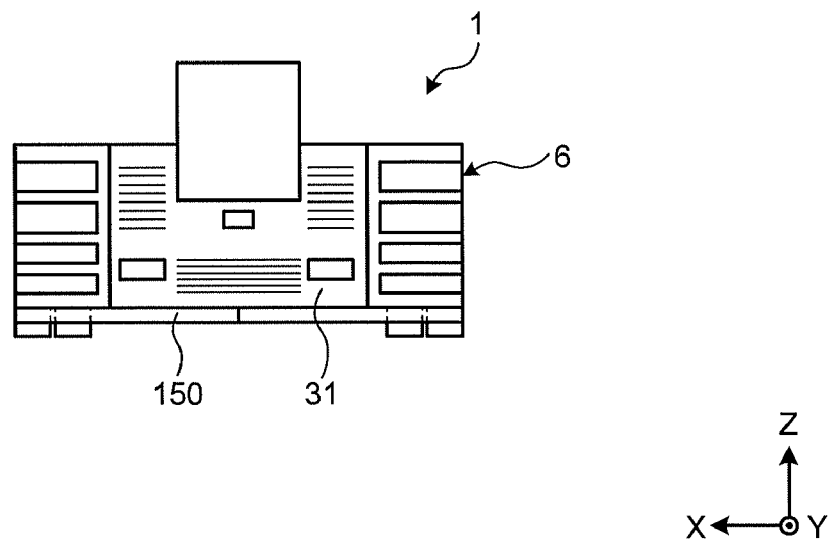
FIG. 23 is a front view of an example of the conveyance machine according to the embodiment.

FIG. 23 is another example of the conveyance machine 1. In FIG. 23, the conveyance machine 1 includes a bumper 150 that shoves away an obstacle or an object on the path floor. When the non-contact sensor 62 detects an obstacle ahead of the conveyance machine 1, the conveyance machine 1 may shove away the obstacle with the bumper 150 while continuing traveling.

<Battery Replacement>

Figure 24:
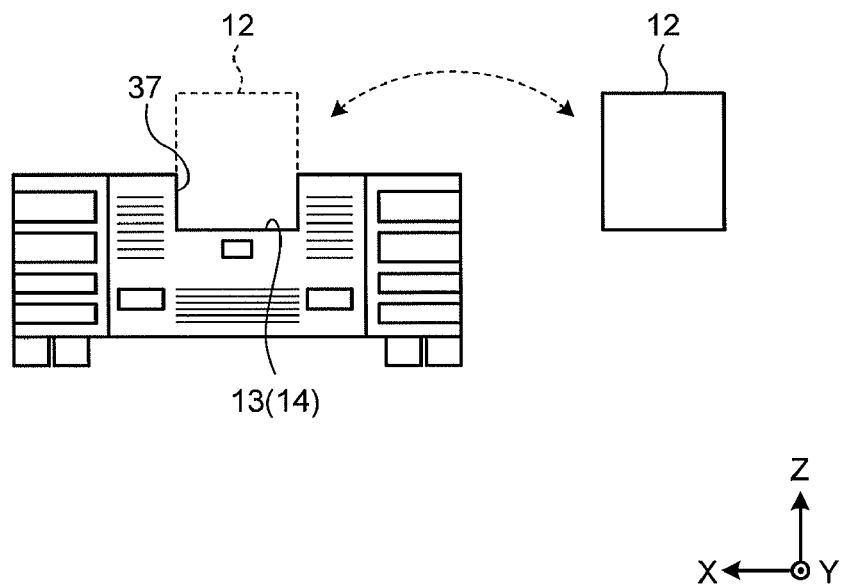
FIG. 24 is a schematic view for explaining an example of an operation of replacing a device according to the embodiment.

As described above, at least a part of the conveyance machine 1 operates by electric power supplied from the battery 12. FIG. 24 illustrates an example where the battery 12 is removed from the holding portion 13 and the holding portion 14. As illustrated in FIG. 24, the battery 12 is replaceable. A replacing station EX (see FIG. 2) where the battery 12 is replaced is provided at a portion of the drift DR. The holding portion 13 and the holding portion 14 detachably support the battery 12. When the remaining capacity of the battery 12 has fallen, the conveyance machine 1 can move to the replacing station EX to replace the battery 12. In the embodiment, the battery 12 can be replaced by sliding forward or backward to the recessed portion 37. This is the same for the recessed portion 47.

In the embodiment, the device 12 detachably supported on the holding portion 13 and the holding portion 14 is regarded as a battery. The device 12 is not limited to a battery. For example, an electronic device including a storing unit that stores a program related to traveling may be detachably supported on the holding portion 13 and the holding portion 14. In the embodiment, the traveling unit 5 operates by electric power. If the traveling unit 5 operates by fuel, a container containing the fuel may detachably be supported on the holding portion 13 and the holding portion 14. In such a case, the device 12 can be replaced at the replacing station EX.

<Management by Management System>

In the example of the described embodiment, the conveyance machine 1 autonomously travels using the detection system 60, such as the range sensor 61 mounted on the conveyance machine 1. For example, the conveyance machine 1 may be controlled using the management system 100 including a detection system 602 provided in the loading machine 2 and a detection system 60D provided in the drift DR.

Figure 25:
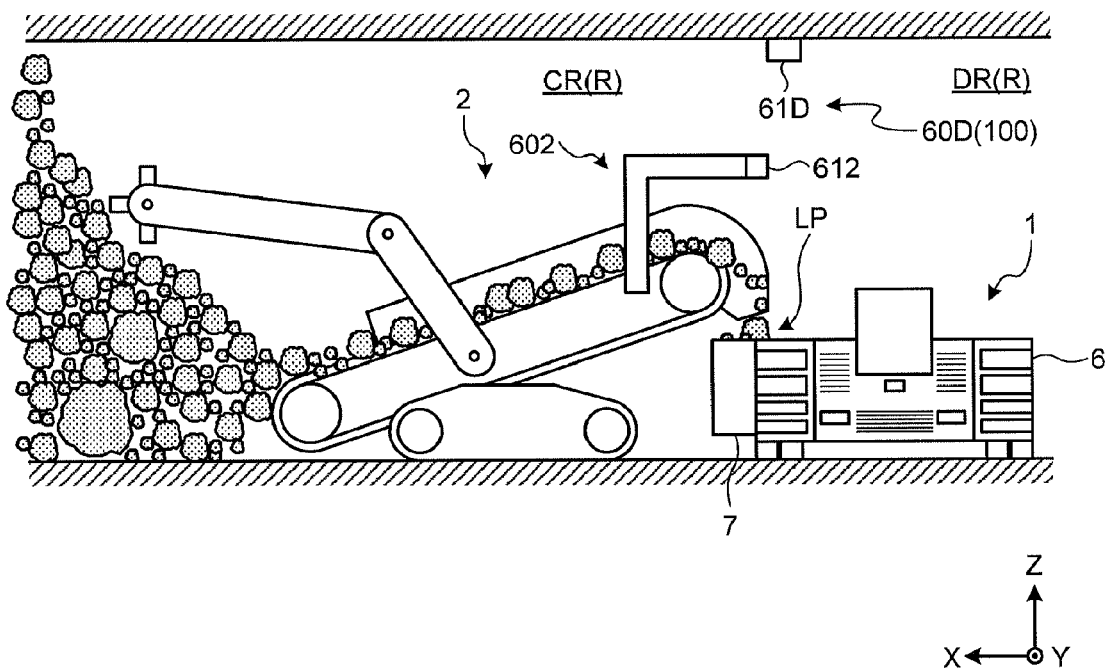
FIG. 25 is a schematic view illustrating an example of processing of the detection system according to the embodiment.

FIG. 25 is an example of a range sensor 612 of the detection system 602 mounted on the loading machine 2 and a range sensor 61D of the detection system 60D provided in the mine tunnel R. For example, in the described embodiment, the relative position between the conveyance machine 1 and the loading machine 2 is detected by the range sensor 61 provided in the conveyance machine 1. The relative position between the conveyance machine 1 and the loading machine 2 may be detected by the range sensor (a position detecting unit) 612 provided in the loading machine 2. The result of the detected relative position may be sent from the loading machine 2 to the conveyance machine 1 or sent from the loading machine 2 via the management unit 80 to the conveyance machine 1. The processing unit 51 of the conveyance machine 1 may adjust the position of the vessel 7 according to the detected result of the range sensor 612 so as the vessel 7 to be positioned at the loading point LP where the loading machine 2 performs loading. The processing unit 51 may adjust the position of the vessel 7 using the slide mechanism 18 or the traveling unit 5. The management unit 80 may send a command signal to the supporting device 17 and the traveling unit 5 according to the detected result of the range sensor 612 so as the vessel 7 to be positioned at the loading point LP. That is, the management unit 80 may remotely operate the conveyance machine 1.

The range sensor 61D may be provided at a predetermined position at least in one or both of the drift DR and the cross-cut CR. If the range sensor 61D is provided in a position where the conveyance machine 1 and the loading machine 2 positioned at the loading point LP can be detected, the relative position between the conveyance machine 1 and the loading machine 2 can be detected. The detected result of the range sensor 61D may be sent to the conveyance machine 1 via the management unit 80.

In the described embodiment, the relative position between the conveyance machine 1 and the wall of the drift DR or the absolute position of the conveyance machine 1 is detected by the detection system 60 including the range sensor 61 and the reading unit 65 provided in the conveyance machine 1. For example, a plurality of reading units that can read an identifier provided on the conveyance machine 1 may be provided in the drift DR, so that the absolute position of the conveyance machine 1 is obtained according to the detected result of the reading unit. In this case, the reading unit functions as a position detecting unit that detects the position of the conveyance machine 1 that travels in the drift DR (the mine tunnel R). A plurality of range sensors 61D that can detect the relative position to the conveyance machine 1 may be provided in the drift DR. The traveling unit 5 of the conveyance machine 1 may be controlled in the drift DR leading to the target point according to the detected result of the detection system 60D provided in the drift DR so as the vessel 7 of the conveyance machine 1 to be positioned at the target point (e.g., the loading point LP or the ore pass OP). The management unit 80 may control the traveling unit 5. That is, the management unit 80 may send a command signal to move the conveyance machine 1 to the target point according to the detected result of the detection system 60D provided in the drift DR, so that the traveling unit 5 travels according to the command signal. That is, the management unit 80 may remotely operate the conveyance machine 1.

An imaging unit (the load detecting unit, or the shape detecting unit) that can detect the condition of the load on the vessel 7 may be mounted on the loading machine 2 or provided at a predetermined position in the drift DR. According to the detected result of the imaging unit, the position of the vessel 7 may be adjusted, the sliding amount of the vessel 7 may be adjusted, or the vessel 7 may be moved back and forth in X direction. The loading condition of the loading machine 2 may be controlled according to the condition of the load on the vessel 7 detected using at least one of the imaging unit provided in the conveyance machine 1, the imaging unit provided in the loading machine 2, and the imaging unit provided at a predetermined position in the drift DR. The loading condition of the loading machine 2 includes the amount of load supplied per unit time (the feeding speed) of the feeder unit 91 and the position of the loading machine 2 to the vessel 7.

The loading condition of the loading machine 2 may be controlled according to the detected result of at least one of the imaging unit that can detect the condition of the load on the vessel 7 and is provided in at least one of the conveyance machine 1, the loading machine 2, and the drift DR and the weight sensor that can detect the weight of the vessel 7. In this case, the loading condition of the loading machine 2 includes at least one of the feeding speed of the feeder unit 91 and the amount of load (the total weight) loaded on the vessel 7 by the loading machine 2.

<Add-UP>

According to the embodiment as described above, the shape and the structure of the conveyance machine 1 are each substantially fore-aft symmetric, so the conveyance machine 1 can travel smoothly in either the +Y direction, which is the forward direction of the front section 6A, or the −Y direction, which is the forward direction of the rear section 6B. If the conveyance machine is not fore-aft symmetric, for example, it is likely that the conveyance machine can move in the forward direction of the front section but cannot move smoothly in the forward direction of the rear section. When the conveyance machine that is not fore-aft symmetric switches the moving direction, for example, the conveyance machine that has traveled pointing the front section to the $+Y_0$ direction may have to repeat turns and reverse movements (make a K-turn) in the mine tunnel R to point the front section to the $-Y_0$ direction. However, the size (the width) of the mine tunnel R is limited in many cases. In such cases, making a K-turn might be difficult. Since the conveyance machine 1 of the embodiment is fore-aft symmetric, the conveyance machine 1 can move smoothly to either of the directions without making a K-turn.

The conveyance machine 1 of the embodiment is right-left symmetric. Thus, even if the loading point LP and the draw point DP are determined in both sides (the $+X_0$ side and the $-X_0$ side) of the drift DR, the loading operation can be performed smoothly from both the sides.

In the embodiment, since the vessel 7 is arranged between the front traveling unit 5A and the rear traveling unit 5B, the conveyance machine 1 becoming high can be suppressed. In many cases, the size (the height) of the mine tunnel R is limited. Since the height of the conveyance machine 1 of the embodiment is suppressed, the conveyance machine 1 can smoothly travel in the narrow mine tunnel R.

The embodiment employs the all-wheel drive, in which the front wheel 8 is driven by the front wheel driving unit 10 and the rear wheel 9 is driven by the rear wheel driving unit 11. Thus, the traveling unit 5 can smoothly move in the mine tunnel R. The front wheel driving unit 10 and the rear wheel driving unit 11 each including the electric motor 16 are respectively arranged in the front and the rear of the conveyance machine 1, so that the electric motor 16 (160) that produces high power can be provided in the conveyance machine 1 while suppressing the height of the conveyance machine 1 becoming high.

In the embodiment, the supporting device 17 that supports the vessel 7 is positioned lower than the top of the front wheel 8 and the top of the rear wheel 9. The height of the conveyance machine 1 becoming high can be suppressed also in this manner.

In the embodiment, the vessel 7 is moved in X direction by the slide mechanism 18. Thus, the vessel 7 can smoothly enter the space below the feeder unit 91 in the narrow mine tunnel R, and the loading operation can be performed smoothly. That is, in the mine tunnel R which has a limited height, it usually may be difficult to position a portion of the vehicle body 6 together with the vessel 7 below the feeder unit 91. In the embodiment, the vessel 7 can solely be positioned below the feeder unit 91 by sliding the vessel 7. Thus, the feeder unit 91 can perform the loading operation smoothly even in the narrow mine tunnel R. In the embodiment, the vessel 7 can slide to both the +X side and the −X side. Thus, the vessel 7 can smoothly be positioned to the loading machine 2 which is positioned either in the +X side or the −X side of the conveyance machine 1.

In the embodiment, the supporting device 17 includes the side dump mechanism 19 and the conveyance machine 1 dumps the load from the vessel 7 by side dumping. Therefore, the conveyance machine 1 becoming high can be suppressed.

In the embodiment, regarding X direction, the top face (the first top face) 34A and the top face (the first top face) 34B of the front section 6A are arranged to be lower than the top face (the third top face) 12D of the battery 12 between the top face 34A and the top face 34B, and the top face (the fourth top face) 44A and the top face (the fifth top face) 44B of the rear section 6B are arranged to be lower than the top face 12D of the battery 12 between the top face 44A and the top face 44B. Thus, for example, when the vessel 7 is positioned below the feeder unit 91, at least a portion of the vehicle body 6 can enter the space below the supplying part of the feeder unit 91 with at least one of the top face 34A, the top face 34B, the top face 44A, and the top face 44B positioned below the supplying part of the feeder unit 91. Therefore, the vessel 7 can be positioned below the feeder unit 91 while suppressing the chances of the feeder unit 91 touching the vehicle body 6. In the embodiment, the top face 7A of the vessel 7 is arranged at the same height as the top face 34 and the top face 44 or lower than the top face 34 and the top face 44, so that the vessel 7 can be positioned below the feeder unit 91 while suppressing the chances of the feeder unit 91 touching the vehicle body 6.

By positioning the top face 34 and the top face 44 at a low height, the device 12 that cannot be arranged on the front section 6A nor the rear section 6B can be arranged in the middle section, regarding X direction, which enables the conveyance machine 1 to travel with the necessary devices 12 mounted thereon.

In the embodiment, the device 12 is detachably supported on each of the holding portion 13 and the holding portion 14, so that the device 12 can be replaced smoothly. When the device 12 is an expendable part, such as a battery, or an updated device, such as a computer program or an electronic device, the conveyance machine 1 can travel smoothly because the device 12 is replaceable.

In the embodiment, both the holding portion 13 and the holding portion 14 may detachably support the device 12, or alternatively, one of the holding portion 13 and the holding portion 14 may detachably support the device 12 while the other one supports the device 12 in an undetachable manner.

In the embodiment, a protection member (a battery cover) for protecting the battery 12 may be provided to cover the top face 34A, the top face 12D of the battery 12, and the top face 34B, or a bracket for attaching thereto various types of sensors of the detection system 60 may be provided. In this case, regarding X direction, the protection member or the bracket may include the first top face of the front section 6A including an end portion of the front section 6A, the second top face of the front section 6B including the other end portion, and the third top face positioned between and higher than the first top face and the second top face. That is, the first top face and the second top face may be arranged on a member other than the vehicle body 6. Alternatively, a member including the first top face and the second top face may be regarded as a part of the vehicle body 6 (the front section 6A). This is the same for the rear section 6B.

Figure 26:
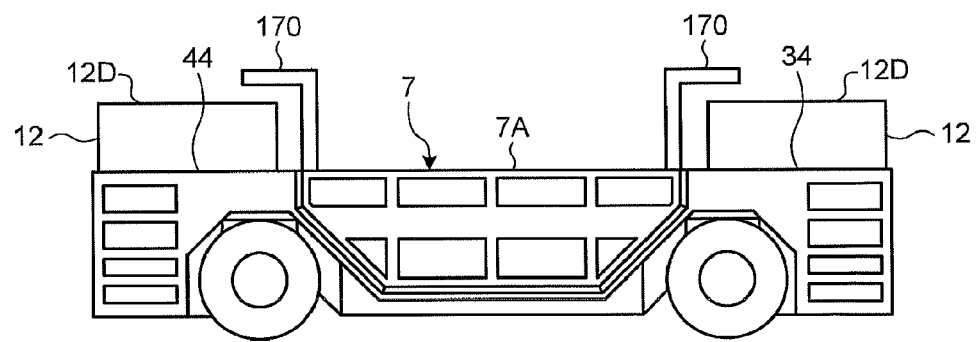
FIG. 26 is a schematic view illustrating an example of a protection member according to the embodiment.

In the embodiment, a structure different from the vessel 7 may be attached to the vessel 7. FIG. 26 illustrates an example where a protection member (a battery guard) 170 for protecting the battery 12 is attached to the vessel 7 as a structure different from the vessel 7. The protection member 170 is a member that prevents a load (ore) hitting the battery 12 during, for example, the operation of loading a load on the vessel 7. As illustrated in FIG. 26, the protection member 170 is arranged higher than the top face 7A of the vessel 7, the top face 34 of the front section 6A, the top face 44 of the rear section 6B, and the top face 12D of the battery 12. In FIG. 26, the top face 7A of the vessel 7 may be arranged to be lower or higher than the top face 34 and the top face 44, or to be on the same plane as the top face 34 and the top face 44. In the example illustrated in FIG. 26, the protection member 170 is a structure different from the vessel 7 but may be regarded as a part of the vessel 7. In this case, the top face of the vessel 7 is arranged higher than the top face 34, the top face 44, and the top face 12D.

In the embodiment, the top face 34 (the top face 34A and the top face 34B) is arranged on the vehicle body 6 (the front section 6A), and the top face 12D positioned between the top face 34A and the top face 34B is provided on the device 12, which is provided separately from the vehicle body 6. The vehicle body 6 and the device 12 may be integrated. That is, the top face 34 and the top face 12D may constitute the top face of a single part. The same can be said for the top face 44 (the top face 44A and the top face 44B) and the top face 12D.

In the embodiment, the imaging unit 64 that detects the shape of the load (the loaded form) on the vessel 7 is provided. Therefore, the position of the vessel 7 to the supplying part of the feeder unit 91 can be adjusted or the vessel 7 can be moved back and forth according to the detected result of the imaging unit 64 so as the load to have a desirable shape. Thus, collapse or falling of a load is suppressed, and the load can be conveyed with the vessel 7 having an increased loading capability.

In the embodiment, the processing unit 51 can autonomously travel according to the detected result of the detection system 60. The processing unit 51 can obtain the relative position between the conveyance machine 1 and the loading machine 2 according to the detected result of the detection system 60 (e.g., the range sensor 61), so that the vessel 7 can be set at an optimum position to the loading machine 2. The processing unit 51 can obtain the relative position between the conveyance machine 1 and the wall of the drift DR according to the detected result of the detection system 60 (e.g., the range sensor 61), so that the traveling unit 5 can travel with suppressed chances of touching the drift DR. The processing unit 51 can obtain the absolute position of the conveyance machine 1 according to the detected result of the detection system 60 (e.g., the reading unit 65), so that the conveyance machine 1 can autonomously travel smoothly.

In the described embodiment, the vessel 7 is provided separately from the vehicle body 6 and movably supported on the vehicle body 6. The vessel 7 may be provided in an integrated manner with the vehicle body 6.

In the described embodiment, the conveyance machine 1 may be a manned vehicle which an operator rides and travels manipulated by the operator.

Configurations of the embodiments described above include a configuration that a person skilled in the art can easily come up to, a configuration that is substantially the same as the described embodiment, and a configuration within the range of so-called equivalency. Configurations of the embodiments described above can suitably be used in combination. There may be a configuration in which a component or components are not used.

REFERENCE SIGNS LIST 1 conveyance machine
2 loading machine
3 control station
4 communication system
5 traveling unit
5A front traveling unit
5B rear traveling unit
6 vehicle body
6A front section
6B rear section
6C recessed section
6D middle section
7 vessel
8 front wheel
9 rear wheel
10 front wheel driving unit
11 rear wheel driving unit
12 device (battery)
12D top face
13 holding portion
14 holding portion
17 supporting device
18 slide mechanism
19 side dump mechanism
34 top face
34A top face
34B top face
44 top face
44A top face
44B top face
51 processing unit
52 storing unit 53 communication unit
60 detection system
61 range sensor
62 non-contact sensor
63 weight sensor
64 imaging unit
65 reading unit
66 velocity sensor
67 acceleration sensor
68 steering sensor
80 management unit
82 processing unit
100 management system
602 detection system
60D detection system
AX center
CR cross-cut (second mine tunnel)
DP draw point
DR drift (first mine tunnel)
LP loading point
M mark
OP ore pass (load dumping point)
R mine tunnel

The invention claimed is:

1. A conveyance machine that conveys a load, the conveyance machine comprising:
   a traveling unit;
   a vehicle body arranged above the traveling unit;
   a vessel provided on the vehicle body;
   a first detecting unit that detects a loading machine that loads a load on the vessel; and
   a processing unit that adjusts a position of the vessel in the direction in the width of the conveyance machine according to a detected result of the first detecting unit so as at least part of the vessel to be positioned on the outer side of the vehicle body at a loading point where the loading machine performs loading.

2. The conveyance machine according to claim 1, wherein the processing unit controls the traveling unit to adjust the position of the vessel.

3. The conveyance machine according to claim 1, further comprising
   a supporting device that supports the vessel in a manner movable to the vehicle body, wherein
   the processing unit controls the supporting device to adjust the position of the vessel.

4. The conveyance machine according to claim 1, further comprising
   a load detecting unit that detects a condition of a load on the vessel, wherein
   the processing unit adjusts the position of the vessel to the loading machine according to a detected result of the load detecting unit.

5. The conveyance machine according to claim 1 configured to convey the load in a mine tunnel, the conveyance machine further comprising
   a second detecting unit that detects the mine tunnel, wherein
   the processing unit controls the traveling unit in the mine tunnel leading to a target point according to a detected result of the second detecting unit so as the vessel to be positioned at the target point.

6. The conveyance machine according to claim 5, wherein the second detecting unit detects a relative position to a wall of the mine tunnel, and
   the processing unit controls the traveling unit according to a detected result of the second detecting unit so as the traveling unit to travel along the wall.

7. The conveyance machine according to claim 5, wherein the second detecting unit detects the wall of the mine tunnel, and
   the conveyance machine further comprises a storing unit that stores information on the wall of the mine tunnel, and
   the processing unit controls the traveling unit in the mine tunnel according to a result of detecting the wall of the mine tunnel by the second detecting unit and the information stored in the storing unit.

8. The conveyance machine according to claim 7, further comprising
   a relative position detecting unit that detects a relative position to a reference point by dead reckoning, wherein
   the processing unit corrects a detected result of the relative position detecting unit according to information on an absolute position in the mine tunnel obtained from a detected result of the second detecting unit.

9. The conveyance machine according to claim 5, wherein the second detecting unit detects a mark provided in the mine tunnel, and
   the processing unit controls the traveling unit in the mine tunnel according to a result of detecting the mark by the second detecting unit.

10. The conveyance machine according to claim 9, further comprising
    a relative position detecting unit that detects a relative position to a reference point by dead reckoning, wherein
    the processing unit corrects a detected result of the relative position detecting unit according to information on an absolute position in the mine tunnel obtained from a detected result of the second detecting unit.

11. The conveyance machine according to claim 5, wherein
    the target point includes one or both of a loading point where a load is loaded on the vessel and a load dumping point where a load is dumped from the vessel.

12. A conveyance machine that conveys a load in a mine tunnel, the conveyance machine comprising:
    a traveling unit;
    a vehicle body arranged above the traveling unit;
    a vessel provided on the vehicle body and configured to be able to move to the direction in the width of the conveyance machine;
    a second detecting unit that detects position information disposed in advance in the mine tunnel; and
    a processing unit that controls the traveling unit in the mine tunnel leading to a target point according to a detected result of the second detecting unit so as the vessel to be positioned at the target point.

13. The conveyance machine according to claim 12, wherein
    the second detecting unit detects a relative position to a wall of the mine tunnel, and
    the processing unit controls the traveling unit according to a detected result of the second detecting unit so as the traveling unit to travel along the wall.

14. The conveyance machine according to claim 12, wherein
    the second detecting unit detects the wall of the mine tunnel, and the conveyance machine further comprises a storing unit that stores information on the wall of the mine tunnel, and the processing unit controls the traveling unit in the mine tunnel according to a result of detecting the wall of the mine tunnel by the second detecting unit and the information stored in the storing unit.

15. The conveyance machine according to claim 14, further comprising a relative position detecting unit that detects a relative position to a reference point by dead reckoning, wherein the processing unit corrects a detected result of the relative position detecting unit according to information on an absolute position in the mine tunnel obtained from a detected result of the second detecting unit.

16. The conveyance machine according to claim 12, wherein the second detecting unit detects a mark provided in the mine tunnel, and the processing unit controls the traveling unit in the mine tunnel according to a result of detecting the mark by the second detecting unit.

17. The conveyance machine according to claim 16, further comprising a relative position detecting unit that detects a relative position to a reference point by dead reckoning, wherein the processing unit corrects a detected result of the relative position detecting unit according to information on an absolute position in the mine tunnel obtained from a detected result of the second detecting unit.

18. The conveyance machine according to claim 12, wherein the target point includes one or both of a loading point where a load is loaded on the vessel and a load dumping point where a load is dumped from the vessel.

19. A management system comprising:

a position detecting unit that detects a relative position between a conveyance machine that can travel in a mine tunnel and a loading machine that loads a load on a vessel of the conveyance machine; and a processing unit that adjusts a position of the vessel in the direction in the width of the conveyance machine according to a detected result of the position detecting unit so as at least part of the vessel to be positioned on the outer side of the vehicle body at a loading point where the loading machine performs loading.

* * * * *